(12) United States Patent
Agetsuma et al.

(10) Patent No.: US 7,587,436 B2
(45) Date of Patent: Sep. 8, 2009

(54) METHOD AND SYSTEM FOR EXECUTING DIRECTORY-BASIS MIGRATION IN A GLOBAL NAME SPACE

(75) Inventors: Masakuni Agetsuma, Yokohama (JP); Youji Nakatani, Yokohama (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 11/477,858

(22) Filed: Jun. 30, 2006

(65) Prior Publication Data

US 2007/0239655 A1    Oct. 11, 2007

(30) Foreign Application Priority Data

Apr. 7, 2006    (JP)    ............................. 2006-106255

(51) Int. Cl.
*G06F 17/30*    (2006.01)
(52) U.S. Cl. .......................................... 707/205; 707/2
(58) Field of Classification Search ........................ None
See application file for complete search history.

(56) References Cited

U.S. PATENT DOCUMENTS 6,671,773 B2    12/2003    Kazar et al.

2003/0110237 A1 *    6/2003    Kitamura et al. ............ 709/219

OTHER PUBLICATIONS

Mondal et al., "Effective Load-Balancing via Migration and Replication in Spatial Grids." Lecture Notes in Computer Science 2736(2003) 202-211. Jul. 8, 2008 <http://citeseerx.ist.psu.edu/viewdoc/summary?doi=10.1.1.3.3273>.*
Shepler et al., "NFS Version 4 Protocol", Standards Track, Apr. 2003, pp. 57-61.

* cited by examiner

*Primary Examiner*—Mohammad Ali
*Assistant Examiner*—Syed H Hasan
(74) *Attorney, Agent, or Firm*—Stites & Harbison, PLLC; Juan Carlos A. Marquez, Esq

(57) ABSTRACT

There has never been disclosed a method of executing migration on a fine-grained basis than a file system basis in a manner that is transparent to clients in a storage system with a plurality of servers to which a global name space is applied. In a storage system with a plurality of servers and a disk subsystem, which is coupled to the plurality of servers, a file system in the disk subsystem is assigned a first identifier, which is unique throughout the storage system, at least one of directories contained in the file system is assigned a second identifier, which is unique throughout the storage system, and a file contained in the file system is assigned a third identifier, which is unique throughout the file system. The server identifies a file below the directory that has the second identifier by the second identifier and by the third identifier.

18 Claims, 18 Drawing Sheets

GNS MANAGEMENT TABLE

| SERVER NAME | LOCAL PATH | CONNECTION POINT |
|---|---|---|
| SERVER A | /mnt/fs0/ | /gns/a/ |
| SERVER A | /mnt/fs1/ | /gns/b/ |
| SERVER B | /mnt/fs2/ | /gns/c/ |

*FIG. 5*

MIGRATION POINT MANAGEMENT TABLE (SERVER A)

| MIGRATION POINT | FILE SYSTEM ID | USED CAPACITY | READ I/O INFORMATION | | WRITE I/O INFORMATION | |
|---|---|---|---|---|---|---|
| | | | NUMBER OF TIMES | BYTE COUNT | NUMBER OF TIMES | BYTE COUNT |
| /gns/ | 0 | | | | | |
| /mnt/fs0/ | 1 | | | | | |
| /mnt/fs0/aa/ | 2 | | | | | |
| /mnt/fs0/ab/ac/ | 3 | | | | | |
| /mnt/fs1/ | 4 | | | | | |

MIGRATION POINT MANAGEMENT TABLE (SERVER B)

| MIGRATION POINT | FILE SYSTEM ID | USED CAPACITY | READ I/O INFORMATION | | WRITE I/O INFORMATION | |
|---|---|---|---|---|---|---|
| | | | NUMBER OF TIMES | BYTE COUNT | NUMBER OF TIMES | BYTE COUNT |
| /mnt/fs2/ | 6 | | | | | |

FILE SYSTEM ID MANAGEMENT TABLE

| FILE SYSTEM ID | STATE |
|---|---|
| 0 | ASSIGNED |
| 1 | ASSIGNED |
| 2 | ASSIGNED |
| 3 | ASSIGNED |
| 4 | ASSIGNED |
| 5 | UNASSIGNED |
| 6 | ASSIGNED |
| 7 | UNASSIGNED |

*FIG. 7*

GNS MANAGEMENT TABLE

| SERVER NAME | LOCAL PATH | CONNECTION POINT |
|---|---|---|
| SERVER A | /mnt/fs0/ | /gns/a/ |
| SERVER A | /mnt/fs1/ | /gns/b/ |
| SERVER B | /mnt/fs2/ | /gns/c/ |
| SERVER A | /mnt/fs3/ | /gns/a/ab/ac/ |

*FIG. 12*

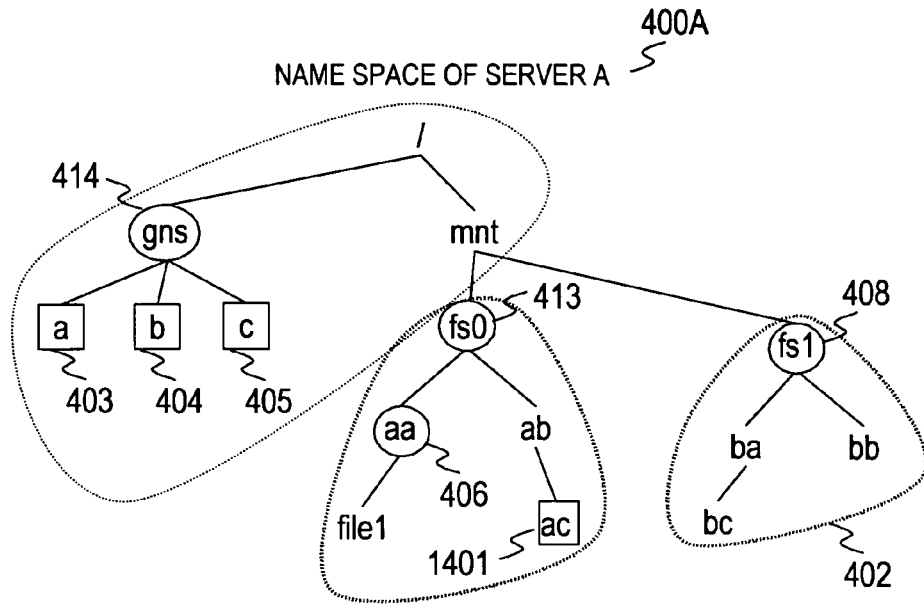
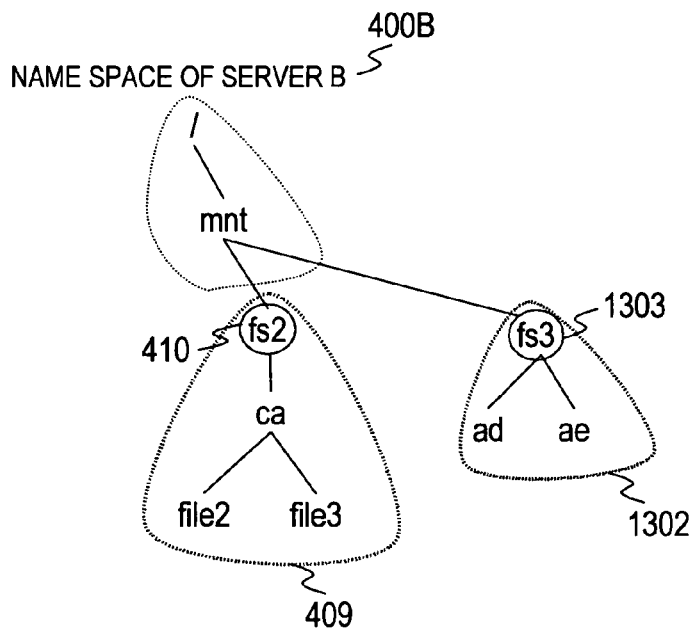
FIG. 14

GNS MANAGEMENT TABLE

| SERVER NAME | LOCAL PATH | CONNECTION POINT |
|---|---|---|
| SERVER A | /mnt/fs0/ | /gns/a/ |
| SERVER A | /mnt/fs1/ | /gns/b/ |
| SERVER B | /mnt/fs2/ | /gns/c/ |
| SERVER B | /mnt/fs3/ | /gns/a/ab/ac/ |

*FIG. 15*

METHOD AND SYSTEM FOR EXECUTING DIRECTORY-BASIS MIGRATION IN A GLOBAL NAME SPACE

CLAIM OF PRIORITY

The present application claims priority from Japanese application JP2006-106255 filed on Apr. 7, 2006, the content of which is hereby incorporated by reference into this application.

BACKGROUND

This invention relates to a technique of distributing a load among a plurality of servers in a file server or network attached storage (NAS) that is connected to clients via a network and stores data used by the clients.

There has been proposed a NAS in which a storage system connected to a network is used as a shared disk by client computers connected to the network. The NAS is composed of at least one server that contains a network interface and other components, and at least one disk drive that stores data.

To give an example, U.S. Pat. No. 6,671,773 discloses a NAS with a cluster configuration in which a plurality of servers are connected to a network. In a system described in U.S. Pat. No. 6,671,773, network elements, switching elements, and disk elements correspond to servers of the NAS. The system described in U.S. Pat. No. 6,671,773 can have a plurality of network elements that share a file system. The system described in U.S. Pat. No. 6,671,773 also has a plurality of disk elements to migrate data on a disk basis. Each of the network elements can access all file systems that are managed by the disk elements. The migration of a disk storing a file system between disk elements does not prevent each network element from accessing all the file systems.

A network file system (NFS) has been proposed as a type of file system that allows access to files dispersed on a network. According to NFS v4, the latest version of NFS at present (see RFC 3530, "NFS version4", P. 57-61, IETF Home Page, searched online on Mar. 15, 2006, Internet, URL: http://www.ietforg/home.html), when a file system migrates between servers, the servers notifies a client that attempts to access the file system of information on to where the file system has migrated. Receiving the information, the client accesses the file system at the migration destination by following the notified location information.

SUMMARY

A plurality of file systems managed by a plurality of servers can be provided to clients in one name space. This name space is called a global name space (GNS). In a system to which a GNS is applied, the load is balanced among a plurality of servers through migration in which files are transferred from a heavy-load server to a light-load server.

A file has to hold on to its assigned ID (file handle) in order to execute load balancing migration in a GNS in a manner that is transparent to clients. In other words, a file handle assigned before migration has to be valid after the migration. A file handle contains a file system ID for unique identification of a file system throughout a server that manages this file system and a file ID for unique identification of a file throughout the file system.

To maintain the consistency of a file handle, a file system ID unique throughout the GNS-applied system may be assigned to each file system so that migration is executed on a file system basis. In this case, each file is given a file handle that is independent of servers managing file systems and unique throughout the GNS-applied system. This eliminates the need for a client attempting to access a file to have knowledge of which server manages a file system to which the file belongs. In other words, after a file system migrates from one server to another, clients can access files belonging to this file system through file handles that are assigned to the files before the migration is executed. Migration of a file system that is transparent to clients is thus achieved.

However, in migration that is executed for the purpose of balancing the load among servers, the granularity of file system-basis transfer is too coarse to achieve satisfactory load balancing. For instance, when one file system alone is burdened with heavy load, migrating the entirety of this file system merely relocates the whole load of the file system instead of distributing and balancing the load among a plurality of servers. In such cases, it is necessary to set the unit of migration more fine-grained than a file system basis, for example, a directory basis.

Migration can be executed on a fine-grained basis than a file system basis by, for example, copying an arbitrary file or directory that is managed by one server to a file system that is managed by another server. The load generated by access to the file or directory is thus distributed, thereby making it possible to balance the load among a plurality of servers. In this case, however, clients cannot use a file handle that is obtained before the migration is executed in accessing the migrated file or directory. In short, name resolve has to be executed again.

How to execute migration on a fine-grained basis than a file system basis in a manner that is transparent to clients has never been disclosed.

According to a representative aspect of this invention, there is provided a storage system, characterized in that the storage system includes: a plurality of servers; and a disk subsystem coupled to the plurality of servers, each of the servers including: an interface coupled to a network; a processor coupled to the interface; and a memory coupled to the processor, the disk subsystem including at least one logical device containing at least one file system, and in that: each file system is assigned a first identifier that is unique throughout the storage system; at least one of directories contained in the file system is assigned a second identifier that is unique throughout the storage system; a file contained in the file system is assigned a third identifier that is unique throughout the file system; and the processor identifies a file below the directory that has the second identifier by the second identifier and the third identifier.

Desirably, the processor identifies a file below the directory that has the second identifier by the third identifier and by the second identifier of a directory that is closest to this file among directories that are above this file and are each assigned its own second identifier.

According to an embodiment of this invention, a file system is divided and migration can be executed separately for each section of the file system. Directory-basis migration can thus be executed in a manner that is transparent to clients. The fine unit of migration makes it possible to better balance the load among servers and accordingly improves the overall performance of the storage system.

BRIEF DESCRIPTION OF THE DRAWINGS

FIG. 5 is an explanatory diagram showing an example of a GNS management table according to the embodiment of this invention.

FIG. 6A is an explanatory diagram showing an example of a migration point management table according to the embodiment of this invention.

FIG. 6B is an explanatory diagram showing an example of a migration point management table according to the embodiment of this invention.

FIG. 7 is an explanatory diagram of a file system ID management table according to the embodiment of this invention.

FIG. 12 is an explanatory diagram showing an example of a GNS management table after local dividing is executed in the embodiment of this invention.

FIG. 14 is an explanatory diagram showing an example of name spaces after remote dividing is executed in the embodiment of this invention.

FIG. 15 is an explanatory diagram showing an example of a GNS management table after remote dividing is executed in the embodiment of this invention.

DETAILED DESCRIPTION OF THE PREFERRED EMBODIMENT

Figure 1:
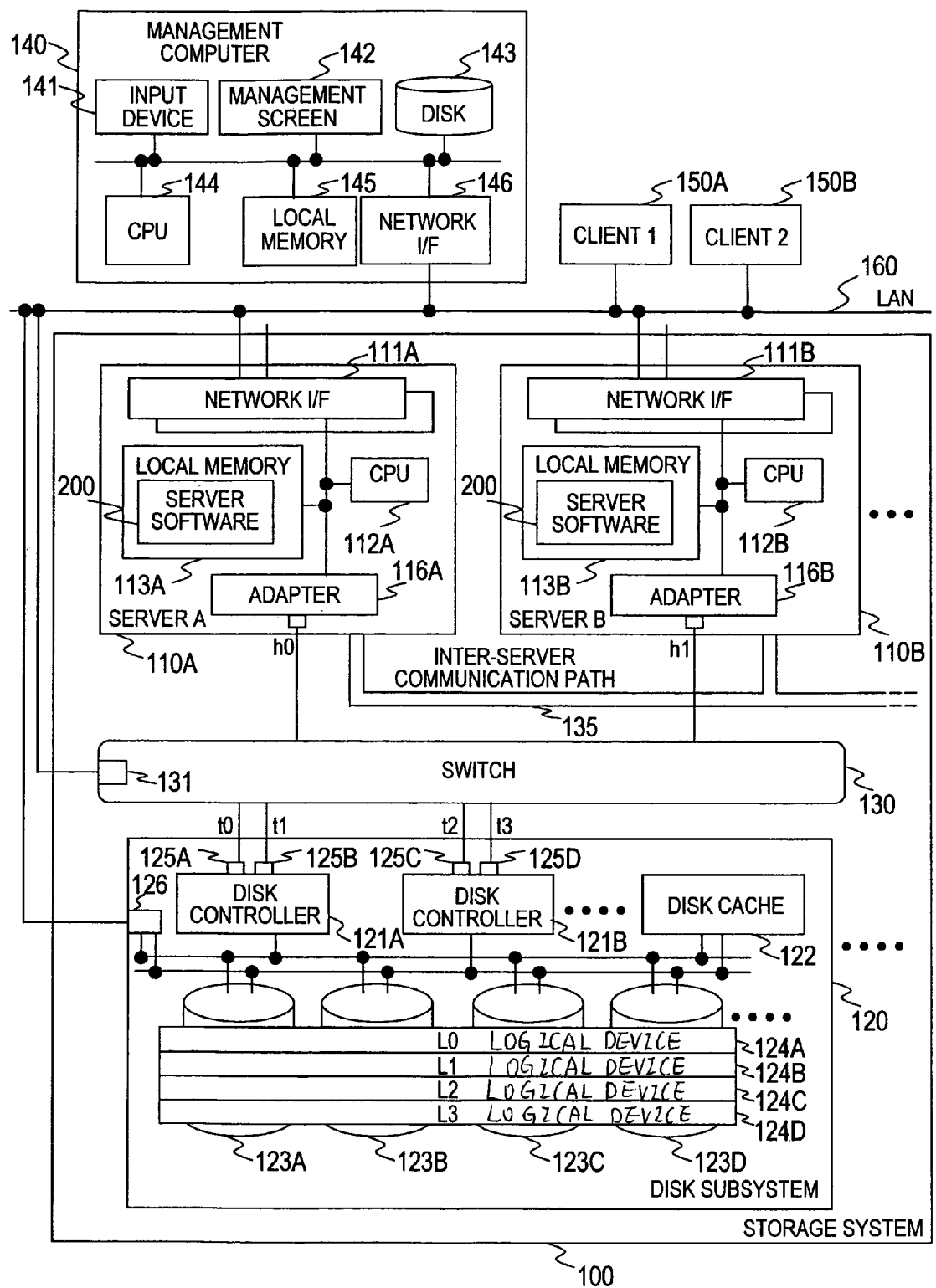
FIG. 1 is a block diagram showing a configuration of a storage system according to an embodiment of this invention.

FIG. 1 is a block diagram showing a configuration of a storage system 100 according to an embodiment of this invention.

A computer system according to the embodiment of this invention has the storage system 100, a management computer 140, a client 150A, a client 150B, and a LAN 160, which interconnects the storage system and these computers.

The management computer 140 is a computer that executes processing for managing the storage system 100. For instance, the management computer 140 instructs servers 110 to create a file system in the storage system 100, mount a file system, or migrate a file system. The management computer 140 also instructs a disk subsystem 120 and a switch 130 to change configurations.

The management computer 140 has, at least, an input device 141, a management screen 142, a disk 143, a CPU 144, a local memory 145, and a network interface (I/F) 146, which are connected to one another. The management computer 140 may be composed of: a housing (not shown) that houses the CPU 144, the local memory 145, and the network I/F 146; the input device 141; the management screen 142; and the disk 143, which are connected to the housing. The input device 141 is, for example, a keyboard or a pointing device that a system administrator uses. The management screen 142 is, for example, an image display device that displays information to the system administrator. What information is displayed on the management screen 142 and how the management computer 140 is operated with the pointing device will be described later with reference to FIGS. 16 and 17.

The disk 143 stores, at least, a program for communications with the servers 110 or the like and a program for management of the disk subsystem 120. Those programs are read onto the local memory 145 and executed by the CPU 144. The network I/F 146 is used for communications with the servers 110 and with the disk subsystem 120.

The clients 150A and 150B are computers that access files in the storage system 100. The clients 150A and 150B write files in the storage system 100, or read files out of the storage system 100. In writing or reading files, file systems managed by the storage system 100 are utilized. The clients 150A and 150B each have, at least, a memory (not shown) for storing a program that executes file access and a processor (not shown) that executes the program stored in the memory.

Although FIG. 1 shows two clients (150A and 150B), an arbitrary number of clients can be connected to the LAN 160 to access the storage system 100. In the following description, "client 150" will be used as a generic reference to the clients 150A and 150B when there is no need to discriminate the two clients from each other.

The LAN 160 is a network that uses such a communication protocol as TCP/IP.

The storage system 100 is a network attached storage (NAS). The storage system 100 has a server 110 A, a server 110B, the disk subsystem 120, and the switch 130, which interconnects the servers and the disk subsystem.

The switch 130 is, for example, a Fibre Channel (FC) switch. The storage system 100 may have more than one switch 130. One or more switches 130 may constitute a storage area network (SAN). The switch 130 may be a LAN switch or a switch dedicated to the storage system.

The servers 110A and 110B are computers that access the disk subsystem 120 following access requests that are received from the client 150.

In the following description, "server 110" will be used as a generic reference to the servers 110A and 110B when there is no need to discriminate the two servers from each other. The following description also employs simple terms "server A" and "server B" for the servers 110A and 110B, respectively. FIG. 1 shows two servers (110A and 110B), but the storage system 100 may have more than two servers 110. The servers 110 are also called NAS heads or NAS nodes. A plurality of servers 110 may be arranged into a cluster configuration.

The server 110A has a network interface 111A, a CPU 112A, a local memory 113A, and an adapter 116A, which are connected to one another.

The network interface 111A is an interface that is connected to the LAN 160 to communicate with the management computer 140 and the client 150.

The CPU 112A is a processor that controls the operation of the server 110A. To be specific, the CPU 112A executes a program stored in the local memory 113A.

The local memory 113A is, for example, a semiconductor memory, and stores a program executed by the CPU 112A and data referred to by the CPU 112A. To be specific, the local memory 113A stores a mount table (not shown), server software 200, which will be described later, and a migration point management table 600, or the like.

The adapter 116A is an interface connected to the switch 130 to communicate with the disk subsystem 120.

As the server 110A, the server 110B has a network interface 111B, a CPU 112B, a local memory 113B, and an adapter 116B, which are similar to the network interface 111A, the CPU 112A, the local memory 113A, and the adapter 116A. Descriptions on the components of the server 110B will therefore be omitted. In the case where the storage system 100 has more than two servers 110, each of the servers 110 can have the same configuration as the server 110A.

A plurality of servers 110 of the storage system 100 are connected to one another by an inter-server communication path 135. The servers 110 communicate with one another via the inter-server communication path 135.

To be specific, when a GNS management table 500 described later is updated in one of the servers 110, the update made to the GNS management table 500 is sent to the rest of the servers 110 via the inter-server communication path 135. Each of the transmission destination servers 110 makes the received update reflected on its own GNS management table 500.

The inter-server communication path 135 in the storage system 100 of this embodiment is, as shown in FIG. 1, independent of the switch 130 and the LAN 160 both. However, the servers 110 may communicate with one another via the switch 130 or the LAN 160. The servers 110 may also communicated with one another via a disk cache 122 of the disk subsystem 120. This invention can be carried out irrespective of which one of the above routes is employed for communications between the servers 110.

The disk subsystem 120 has a disk controller 121A, a disk controller 121B, the disk cache 122, and disk drives 123A to 123D, which are connected to one another. The disk controller 121A has ports 125A and 125B connected to the switch 130. The disk controller 121B has ports 125C and 125D connected to the switch 130. In the following description, "disk controller 121" will be used as a generic reference to the disk controllers 121A and 121B when there is no need to discriminate the two disk controllers from each other. Also, "port 125" will be used as a generic reference to the ports 125A to 125D when there is no need to discriminate them from one another. The disk subsystem 120 may have one disk controller 121 or three or more disk controllers 121, instead of two. Each disk controller 121 may have one port 125 or three or more ports 125, instead of two.

The disk controller 121 communicates with the server 110 via the switch 130, which is connected to the port 125, to control the disk subsystem 120. To be specific, the disk controller 121 writes data in the disk drives 123A to 123D or reads data out of the disk drives 123A to 123D as requested by the server 110.

The disk cache 122 is, for example, a semiconductor memory, and temporarily stores data to be written in the disk drives 123A to 123D or data that is read out of the disk drives 123A to 123D.

The disk drives 123A to 123D are hard disk drives for storing data. The disk subsystem has an arbitrary number of disk drives 123A, or the like. In the following description, "disk drive 123" will be used as a generic reference to the disk drives 123A to 123D when there is no need to discriminate them from one another. The disk drives 123 may constitute RAID (Redundant Arrays of Inexpensive Disks).

Storage areas of the disk drives 123 are divided into an arbitrary number of logical devices (LDEVs). FIG. 1 shows as an example four logical devices, LDEVs 124A to 124D. In the following description, "LDEV 124" will be used as a generic reference to the LDEVs 124A to 124D when there is no need to discriminate them from one another. The LDEV 124 is an area that is treated by the disk controller 121 as a logical disk drive. In the case where the disk drives 123 constitute RAID, one LDEV 124 may be composed of storage areas of a plurality of disk drives 123 as shown in FIG. 1. Each LDEV 124 can have an arbitrary size.

An LDEV identifier (ID) is assigned to each LDEV. In the example of FIG. 1, the LDEVs 124A to 124D are assigned IDs L0 to L3, respectively.

The server 110 creates a file system in each LDEV 124 and manages the file system. Each file system is given a file system identifier (ID) that is unique throughout the storage system 100.

The storage system 100 may have a plurality of disk subsystems 120. In this case, one server 110 may be allowed to access only a specific disk subsystem 120 or a specific group of disk subsystems 120. Alternatively, every server 110 may be allowed to access all disk subsystems 120.

The switch 130 and the disk subsystem 120 have management ports 131 and 126, respectively, which are connected to the LAN 160. The management computer 140 communicates with the management ports 131 and 126 via the LAN 160, to thereby refer to or update configurations of the switch 130 and the disk subsystem 120.

Figure 2:
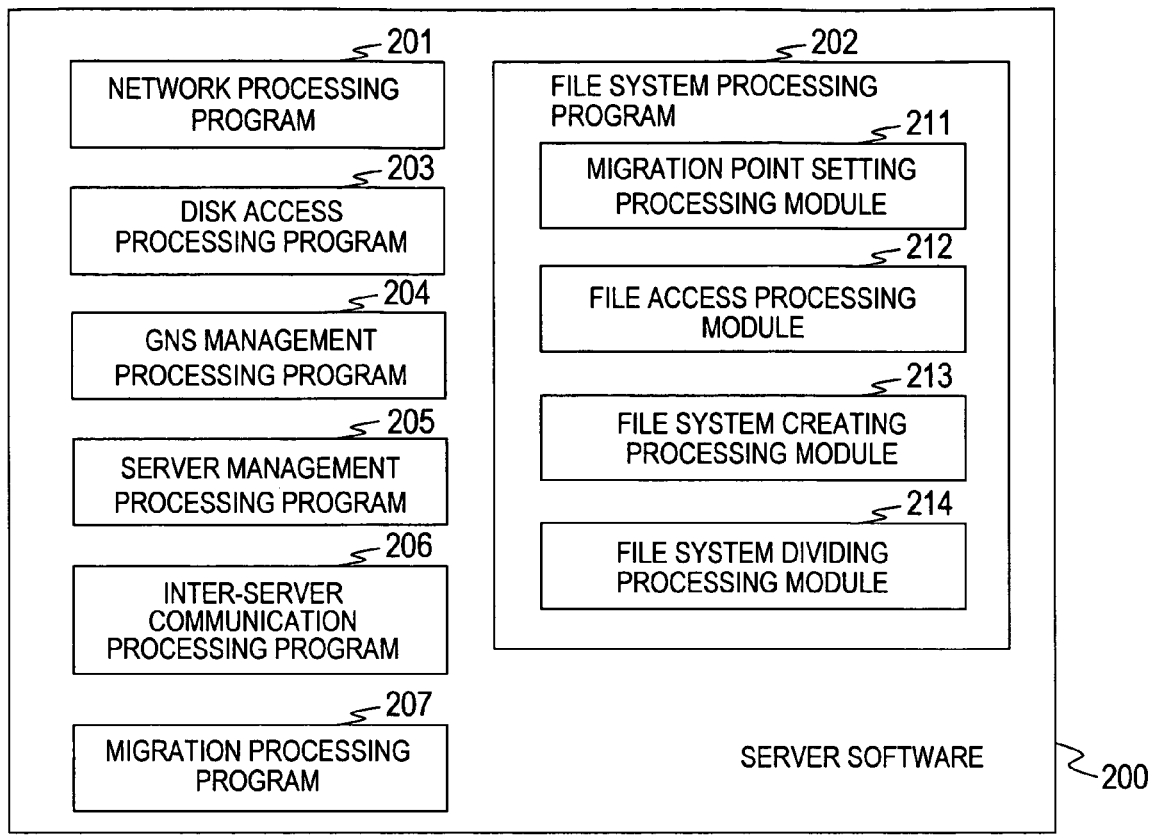
FIG. 2 is an explanatory diagram of server software according to the embodiment of this invention.

FIG. 2 is an explanatory diagram of the server software 200 according to the embodiment of this invention.

The server software 200 contains programs executed by the CPU 112. To be specific, the server software 200 contains a network processing program 201, a file system processing program 202, a disk access processing program 203, a GNS management processing program 204, a server management processing program 205, an inter-server communication processing program 206, and a migration processing program 207.

The network processing program 201 is a program that controls communications with the management computer 140 and the client 150 via the LAN 160.

The file system processing program 202 is a program that processes a request made by the client 150 to access a file in a file system, an instruction given from the management computer 140 to a file system, and the like. A more detailed description on the file system processing program 202 will be described later.

The disk access program 203 is a program that actually accesses the disk subsystem 120 in accordance with a file access request received by the file system processing program 202.

The GNS management processing program 204 updates the GNS management table 500 after the migration processing program 207 executes migration of a file system. Details of the GNS management table 500 will be described later with reference to FIG. 5.

The server management processing program 205 is a program that communicates with the management computer 140 to configure the server 110. For instance, upon receiving an instruction to create a new file system from the management computer 140, the server management processing program 205 relays the instruction to the file system processing program 202 and has the file system processing program 202 execute creation of a new file system. Upon receiving a migration instruction from the management computer 140, the server management processing program 205 relays the instruction to the migration processing program 207 and has the migration processing program 207 execute migration.

The inter-server communication processing program 206 is a program that controls communications between the servers 110 via the inter-server communication path 135. For example, in updating its own GNS management table 500, the inter-server communication processing program 206 sends an update made to its own GNS management table 500 to the GNS management processing program 204 that is executed in each of the other servers 110.

The migration processing program 207 is a program that executes migration. The migration refers to processing for moving one file system or the like from the server 110 that currently manages the file system to another server 110 that is designated.

An access request made by the client 150 that attempts to access a file in a file system is processed by the server 110 that manages the file system. Therefore, migrating a file system results in distributing the load to a migration destination server. The load on each of the servers 110 is balanced by the migration processing, and the overall performance of the storage system 100 is accordingly improved.

The file system processing program 202 contains a migration point setting processing module 211, a file access processing module 212, a file system creating processing module 213, and a file system dividing processing module 214.

The migration point setting processing module 211 executes processing of updating the migration point management table 600 following an instruction of the management computer 140.

The file access processing module 212 executes name resolve processing for a directory name or a file name in accordance with a request from the client 150, and responds to the client 150 by sending a file handle, which is a file identifier, to the client 150. For example, in the case where a directory name or a file name that the client 150 requests belongs to a directory tree managed by another server 110, the file access processing module 212 sends, in response, information (for example, the ID of the server 110) on the location of the server 110 that manages the directory tree. The directory tree is one or more directories corresponding to the entirety of or a part of a file system.

The file system creating processing module 213 newly creates a file system following an instruction of the management computer 140. The file system creating processing module 213 also creates a new file system following an instruction of the file system dividing processing module 214.

The file system dividing processing module 214 executes file system dividing processing following an instruction from the migration processing program 207. Details of the file system dividing processing will be described later with reference to FIG. 9.

Figure 3:
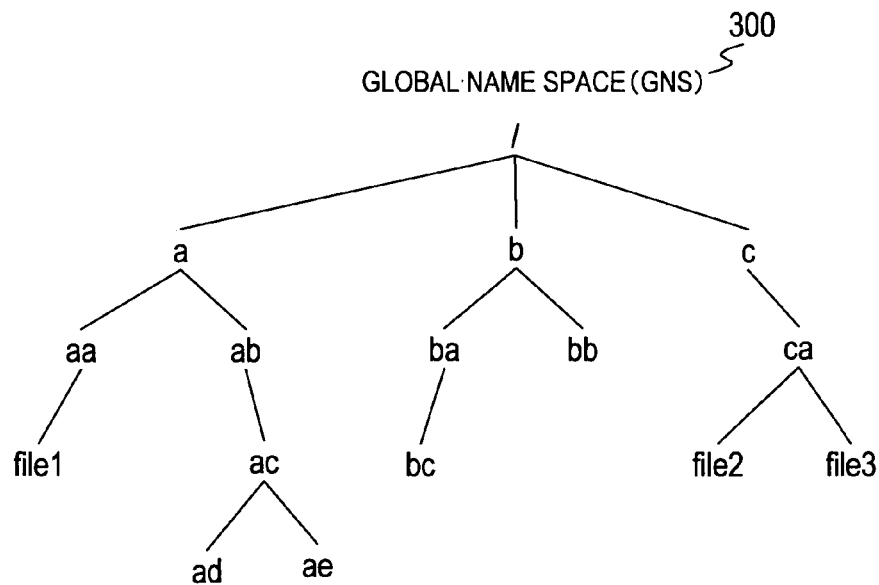
FIG. 3 is an explanatory diagram showing an example of a global name space that is provided to clients in the embodiment of this invention.

FIG. 3 is an explanatory diagram showing an example of a global name space that is provided to the clients 150 in the embodiment of this invention.

The global name space is composed of one or more servers 110. To be specific, the global name space (GNS) is one shared name space constructed by integrating file systems managed by the respective servers 110. FIG. 3 shows a GNS 300, which contains the minimum directories and files necessary to explain the embodiment. An actual GNS can contain more directories and files.

The GNS 300 is composed of two servers, namely, the server A and the server B. Name spaces of the respective servers will be described next.

Figure 4:
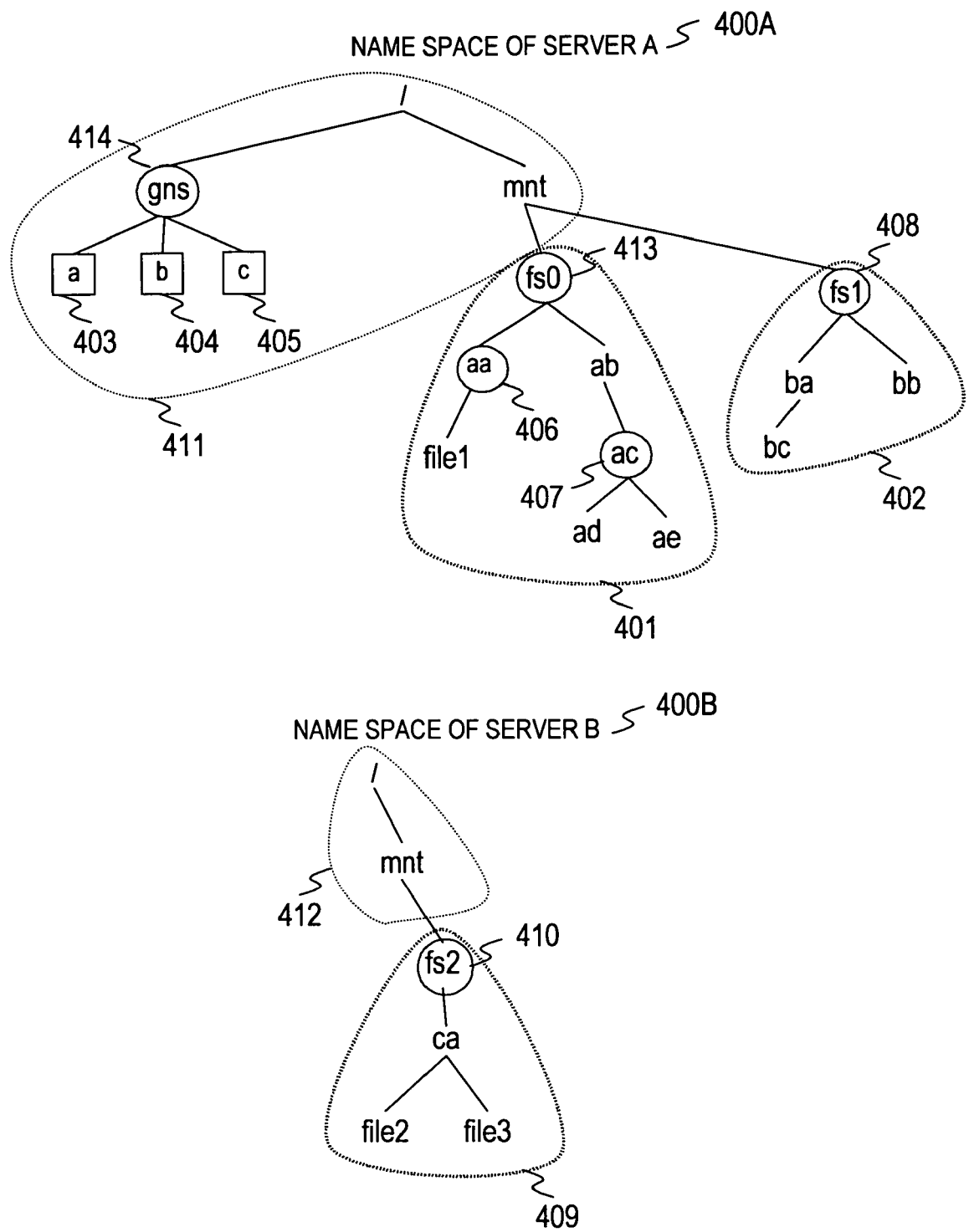
FIG. 4 is an explanatory diagram showing name spaces of servers according to the embodiment of this invention.

FIG. 4 is an explanatory diagram showing name spaces of the servers 110 according to the embodiment of this invention.

FIG. 4 shows, as an example, a name space 400A of the server A and a name space 400B of the server B. First, description will be given on a method of constructing the name spaces 400A and 400B, followed by a description on a method of constructing the GNS 300.

The server A manages three file systems 411, 401, and 402. The name space 400A is constructed by integrating directory trees that belong to those three file systems.

Directories "gns" 414 and "mnt" are placed under a topmost directory of a directory tree that corresponds to the file system 411. Placed under the directory "gns" 414 are three directories, "a" 403, "b" 404, and "c" 405. Placed under the directory "mnt" are a directory "fs0" 413 and a directory "fs1" 408.

Directories "aa" 406 and "ab" are placed under a topmost directory of a directory tree that corresponds to the file system 401. Placed under the directory "aa" 406 is a file "file 1". Placed under the directory "ab" is a directory "ac". Placed under the directory "ac" are directories "ad" and "ae".

Directories "ba" and "bb" are placed under a topmost directory of a directory tree that corresponds to the file system 402. Placed under the directory "ba" is a directory "bc".

A root directory "/" of the name space 400A is the topmost directory of the file system 411. The server A links the topmost directory of the file system 401 to a path "/mnt/fs0/" in the directory tree that corresponds to the file system 411, and links the topmost directory of the file system 402 to a path "/mnt/fs1/", to thereby construct one name space 400A. Linking directory trees of file systems that are managed by one server 110 to each other in this manner is called local mounting. A file system having a root directory as the file system 411 is called a root file system.

The server B manages two file systems 412 and 409. The name space 400B is constructed by integrating directory trees that belong to those two file systems.

Directory "mnt" is placed under a topmost directory of a directory tree that corresponds to the file system 412. Placed under the directory "mnt" is a directory "fs2" 410.

Directory "ca" is placed under a topmost directory of a directory tree that corresponds to the file system 409. Placed under the directory "ca" is a file "file2" and "file3".

A root file system of the name space 400B is the file system 412. The directory tree corresponding to the file system 409 is locally mounted to a path "/mnt/fs2/" in the root file system, to thereby construct the name space 400B.

Shown next is a method of constructing the global name space (GNS) 300 by integrating a part of the name space 400A of the server A and a part of the name space 400B of the server B which are described above.

The path "/gns/" of the name space 400A is set as a root directory "/" of the GNS 300. The server A, which has the root directory of the GNS 300, is called a GNS root server, and the path "/gns/" of the name space 400A is called a GNS root directory. Which server is a GNS root server and which directory is a GNS root directory are stored in the server software 200.

Directory trees below the GNS root directory ("/gns/" of the name space 400A) are directory trees belonging to the GNS 300. Connection points can be formed below the GNS root directory. Linking a directory that corresponds to a file system to a connection point constructs one directory tree. Constructing one directory tree by linking a file system to a connection point of the GNS 300 is called "connecting".

Placed under the GNS root directory of the GNS 300 are three connection points "/a/" 403, "/b/" 404, and "/c/" 405. The file system 401, which is locally mounted to the path "/mnt/fs0/" managed by the server A, is connected to the connection point "/a/" 403. The file system 402, which is locally mounted to the path "/mnt/fs1/" managed by the server A, is connected to the connection point "/b/" 404. The file system 409, which is locally mounted to the path "/mnt/fs2/" managed by the server B, is connected to the connection point "/c/" 405.

FIG. 5 is an explanatory diagram showing an example of the GNS management table 500 according to the embodiment of this invention.

The GNS management table 500 is stored in the local memory 113 of each server 110, and each server 110 individually manages its own GNS management table 500. Values registered in the GNS management table 500 are the same in every server. The GNS management table 500 is a table for managing all file systems that constitute the GNS 300, and one entry (row) of the table represents one directory connection point.

In the GNS management table 500, the name of the server 110 that manages a file system is registered as a server name 501. A path to which the file system is locally mounted in a name space that is managed by the server 110 registered as the server name 501 is registered as a local path 502. A connection point 503 indicates the path to which the local path 502 of the server 110 that is indicated by the server name 501 is connected on the GNS 300.

The GNS management table 500 may further contain information indicating which server serves as a GNS root server and which directory serves as a GNS root directory. To be specific, when the GNS 300 and the servers 101 are as shown in FIGS. 3 and 4, the GNS management table 500 may contain information indicating that the server A is the GNS root server and "/gns/" is the GNS root directory.

Each server 110 can perform name resolve in a root file system and name resolve in a directory that is locally mounted to the root file system directly or indirectly. To give an example, when an environment of the GNS 300 is as shown in FIG. 3, the server 110A receives from the client 150 a request to access a file "/c/ca/file2" in the GNS 300. The server 110A, which is the GNS root server, adds the GNS root directory "/gns/" to the path "/c/ca/file2", thereby converting the path in the GNS 300 into a local path (i.e., a path in the name space of the server 110A). The resultant path is "/gns/c/ca/file2". The server A is capable of name resolve up through "/gns/", but not "/gns/c/".

Then the server A judges from the GNS management table 500 that "/gns/c/" is managed by the server 110B, and sends location information to the client 150 that has issued the access request. The location information sent here contains the identifier of the server that manages the directory and, if necessary, a local path in the server. Upon receiving the location information, the client 150 issues an access request to the server 110B to access the file "/c/ca/file2" in the GNS 300.

The above example shows a method in which the server A receives a name resolve request and sends to the client 150 information for identifying the server 110B, which manages the name resolve subject file. Alternatively, the server A, receiving a name resolve request from the client 150, may transfer the name resolve request to the server B and have the server B execute name resolve. Also, instead of managing one file system with one server 110 alone as in the above example, a plurality of servers 110 may share and manage one file system. In this case, it is necessary for the server 110 that updates the shared file system to obtain a lock of the file system prior to executing the update and thus make sure that the file system is updated properly.

Before the GNS 300 is provided to the clients 150, the management computer 140 sets in each server 110 a directory path that serves as a base point of dividing a file system. In executing migration, a file system may be divided with the directory path as a base point and sections of the file system may be migrated separately. Fine-grained migration is thus achieved. The directory path serving as a base point of dividing a file system is called a migration point. Each server 110 uses its own migration point management table 600 to manage migration points.

FIGS. 6A and 6B are explanatory diagrams showing examples of the migration point management table 600 according to the embodiment of this invention.

A migration point management table 600A of FIG. 6A is the migration point management table 600 that is stored in the local memory 113A of the server A. A migration point management table 600B of FIG. 6B is the migration point management table 600 that is stored in the local memory 113B of the server B. In the following description, items common to the migration point management tables 600A and 600B will be denoted by symbols similar to those used in FIGS. 6A and 6B but omitting "A" and "B", for example, "migration point 601".

A migration point 601 indicates a local path in the server 110. Registered as the migration point 601 are a GNS root directory used by the client 150 to access a file in the GNS 300 and directories connected to constitute the GNS 300. Each migration point is assigned a file system ID. A directory to serve as a base point of dividing a file system is also registered as a migration point and assigned a file system ID in advance.

For example, in the migration point management table 600A of FIG. 6A, the root directory "/gns/" of the GNS 300, the directories "/mnt/fs0/" and "/mnt/fs1/" connected to the GNS 300, and the directories "/mnt/fs0/aa/" and "/mnt/fs0/ab/ac/" serving as base points of dividing a file system are registered as the migration point 601.

A system administrator can register an arbitrary directory as the migration point 601 in advance.

A file system ID 602 indicates an identifier unique throughout the storage system 100 that is assigned to each file system and to an arbitrary directory tree. The management computer 140 assigns a file system ID unique throughout the storage system 100 when registering the migration point 601 in the migration point management table 600.

When the client 150 executes name resolve of a file below the migration point 601 (i.e., a file belonging to a directory serving as the migration point 601 or a file belonging to a directory tree below the migration point 601), the file system processing program 202 sends a file handle (identifier) to the client 150 in response. The file handle contains, as well as a file ID assigned to the file to be accessed, a file system ID 602 corresponding to the migration point 601 included in an upper directory layer closest to the file to be accessed. For instance, when name resolve is executed for the path "/a/aa/file1" of the GNS, this GNS path corresponds to the local path "/mnt/fs0/aa/file1" of the server A as shown in FIGS. 3 to 5. The migration point 601 that is above and closest to "/mnt/fs0/aa/file1" is "/mnt/fs0/aa/". Accordingly, a file handle sent to the client that has executed the name resolve for "/a/aa/file1" contains a file system ID "2" of the migration point "/mnt/fs0/aa/" and a file ID "file1".

Once the file system ID 602 is assigned to the migration point 601, there is no need to change the file system ID 602 after migration is executed. Each file in the storage system 100 is therefore identified always by the same file handle before and after migration is executed on a directory tree basis below the migration point 601. Utilizing this mechanism makes it possible to divide a file system with a migration point as a base point in a manner that is transparent from the clients 150 (in other words, in a manner that does not require the clients 150 to recognize which server manages which file or directory). Details thereof will be described later with reference to FIGS. 8 and 9.

Registered as a used capacity 603, read I/O information 604, and write I/O information 605 is statistical information of each migration point. The used capacity 603 indicates how much of disk capacity is used by a directory tree below a migration point. The read I/O information 604 indicates how many times a file in the directory tree has been read-accessed and how many bytes of the file in the directory tree have been read. The write I/O information 605 indicates how many times the file in the directory tree has been write-accessed and how many bytes of the file in the directory tree have been written.

The read I/O information 604 and the write I/O information 605 may be, for example, values averaged per second or values accumulated for a given period of time. In addition to information registered as the used capacity 603, read I/O information 604, and write I/O information 605, the migration point management table 600 may hold information that indicates performance changes with time, for example, values logged minute by minute.

Information registered as the used capacity 603, read I/O information 604, and write I/O information 605 can be used as materials for determining from which server 110 to which server 110 a migration point is to be migrated. Details thereof will be described later with reference to FIGS. 16 and 19.

FIG. 7 is an explanatory diagram of a file system ID management table 700 according to the embodiment of this invention.

The file system ID management table 700 is stored somewhere accessible to the management computer 140. In this embodiment, the file system ID management table 700 is stored in the local memory 145 or the disk 143 inside the management computer 140.

The management computer 140 refers to the file system ID management table 700 in order to assign each migration point a file system ID unique throughout the storage system 100. The file system ID management table 700 is composed of a file system ID 701 and a state 702.

Registered as the file system ID 701 is a file system ID that has already been assigned, or is going to be assigned, to each migration point.

Registered as the state 702 is a value that indicates whether or not the file system ID 701 has already been assigned to any migration point. In the case where the state 702 says "assigned", the file system ID 701 has already been assigned to one of the migration points in the storage system 100. In the case where the state 702 says "unassigned", the file system ID 701 is not assigned to any of the migration points in the storage system 100 yet.

In setting a new migration point, the management computer 140 assigns the new migration point the file system ID 701 of an entry that has "unassigned" as the state 702, and then updates the state 702 of this entry to "assigned". This way, a newly set migration point can always be assigned the file system ID 701 that has not been assigned to any of existing migration points in the storage system 100.

Next, migration processing executed in this embodiment will be described.

There are several possible methods of prompting the server 1.10 to execute migration. For instance, a system administrator may give a migration instruction to the server software 200 via the management computer 140. Alternatively, the server software 200 may automatically decide to start migration processing. This invention can be carried out irrespective of whether it is one of the above two methods or an utterly different method employed to prompt the execution of migration processing.

A procedure of executing migration processing in the embodiment of this invention will be described with reference to FIGS. 8 and 9. The programs and modules contained in the server software 200 are stored in the local memory 113 and executed by the CPU 112. Therefore, processing that is executed by these programs and modules in the following description is actually executed by the CPU 112.

Figure 8:
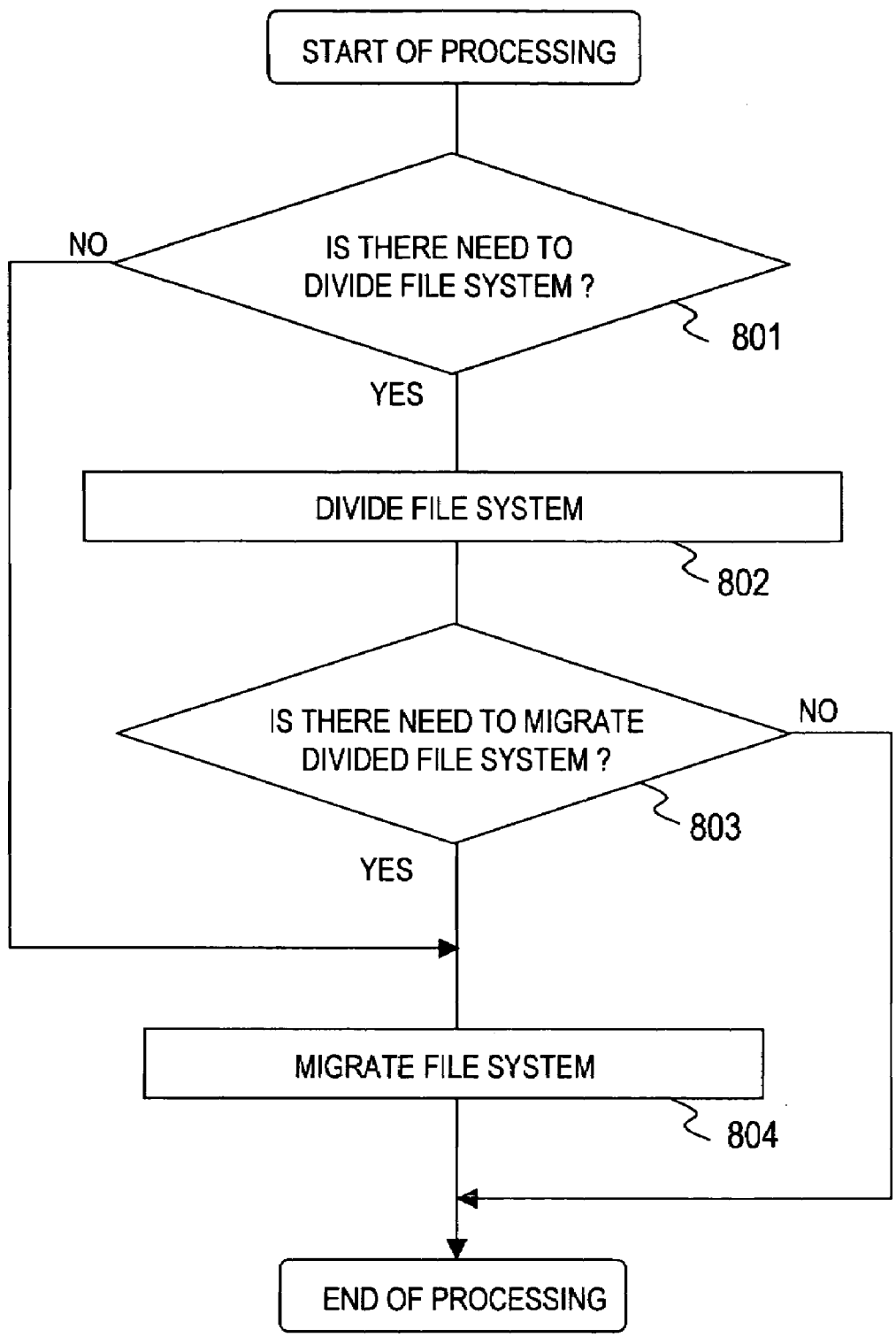
FIG. 8 is a flow chart for processing that is executed by a migration processing program according to the embodiment of this invention.

FIG. 8 is a flow chart for processing executed by the migration processing program 207 according to the embodiment of this invention.

The migration processing program 207 starts the processing shown in FIG. 8 when the server 110 receives from the management computer 140 a migration instruction designating which migration point is to be migrated. Alternatively, the migration processing program 207 itself may judge whether to execute migration by referring to, for example, statistical information registered in the migration point management table 600. Judging that migration should be executed, the migration processing program 207 starts the processing shown in FIG. 8.

First, the migration processing program 207 judges whether it is necessary to divide a file system or not (801).

In the case where a directory tree below the migration point received by the migration processing program 207 corresponds to the entirety of a file system (in other words, when the received migration point is the topmost directory of the file system), the entire file system is migrated. Then, since the file system does not need to be divided, the judgment is "no" and the migration processing program 207 moves to processing of Step 804.

In the case where a directory tree below the migration point received by the migration processing program 207 corresponds to a part of a file system (in other words, when the received migration point is not the topmost directory of the file system), it is necessary to divide the file system. The judgment is therefore "yes" and the migration processing program 207 moves to processing of Step 802.

In Step 802, the migration processing program 207 calls up the file system dividing processing module 214. What processing the file system dividing processing module 214 executes will be described later in detail with reference to FIG. 9.

The migration processing program 207 next judges whether or not it is necessary to migrate a file system newly created through the file system dividing processing of Step 802 (803).

As will be described later, when local dividing is executed in Step 802, the divided file system has to be migrated. When remote dividing is executed, on the other hand, there is no need to migrate the divided file system.

When it is judged in Step 803 that migration has to be executed, the migration processing program 207 executes migration of the divided file system (804) and ends the processing.

To be specific, in Step 804, the migration processing program 207 sends every file contained in a divided file system to be migrated to the server 110 that is the destination of the migration. The migration processing program 207 in the migration destination server stores the received files in one of the LDEVs 124.

On the other hand, when it is judged in Step 803 that migration does not need to be executed, the migration processing program 207 ends the processing without executing migration.

Figure 9:
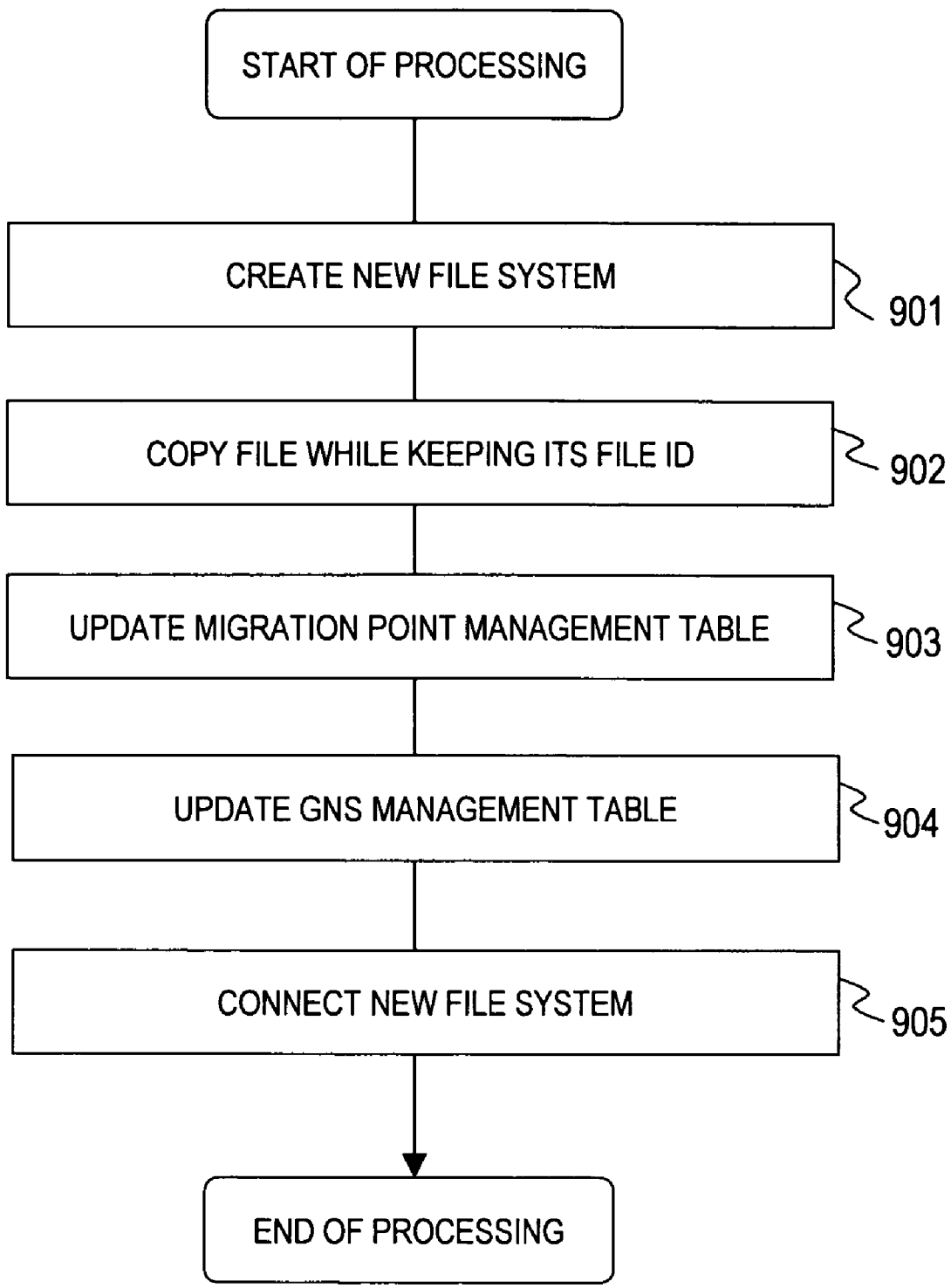
FIG. 9 is a flow chart for processing that is executed by a file system dividing processing module in a file system processing program according to the embodiment of this invention.

FIG. 9 is a flow chart for processing that is executed by the file system dividing processing module 214 in the file system processing program 202 according to the embodiment of this invention.

The processing of FIG. 9 is executed by the file system dividing processing module 214 when the module is called up by the migration processing program 207 in Step 802 of FIG. 8.

First, the file system dividing processing module 214 creates a new file system (901). The new file system that the file system dividing processing module 214 creates may be a file system managed by its own server (the server 110 that manages a file system to be divided), or may be a file system managed by one of other servers 110 than its own server. The former style of dividing is referred to as "local dividing" in the following description. The latter style of dividing is referred to as "remote dividing" in the following description. A specific example of local dividing will be given later with reference to FIGS. 10 to 12. A specific example of remote dividing will be given later with reference to FIGS. 13 to 15.

Next, the file system dividing processing module 214 copies files below a migration point at which dividing takes place to the file system created in Step 901, with their file IDs kept intact (902). The files IDs must be kept intact in order to avoid changing file handles through migration. This makes it necessary for an operation system (OS) of the server 110 to have a file copy function that allows the server 110 to designate a file ID.

The file system dividing processing module 214 next updates the migration point management table 600 (903). How the migration point management table 600 is updated will be described later.

Thereafter, the file system dividing processing module 214 updates the GNS management table 500 (904). To be specific, the file system dividing processing module 214 calls up the GNS management processing program 204 to have the program update the GNS management table 500. How the GNS management processing program 204 updates the GNS management table 500 will be described later with reference to FIGS. 12 and 15.

The file system dividing processing module 214 connects the newly created file system to the GNS (905). To be specific, a mount table (not shown) is updated. The mount table can be updated by the same method that is employed in prior art. A detailed description on how to update the mount table will therefore be omitted.

With this, the file system dividing processing module 214 completes the processing.

Figure 10:
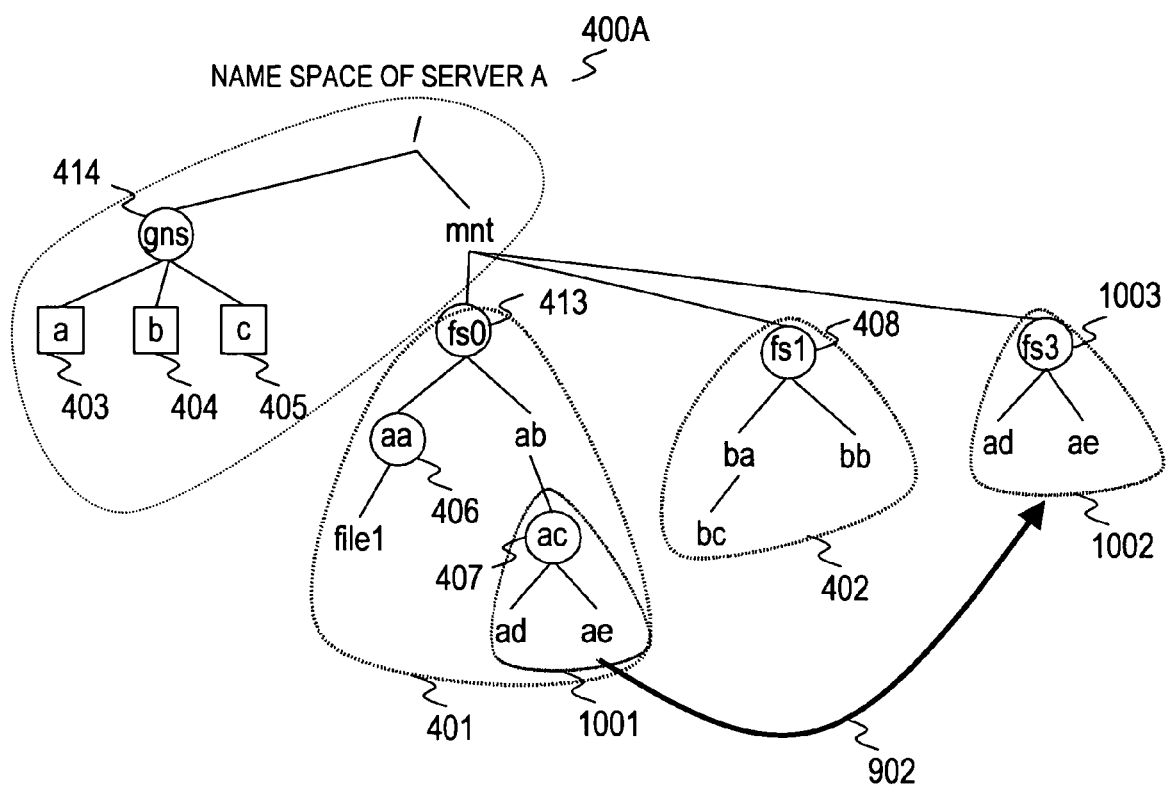
FIG. 10 is an explanatory diagram showing an example of a name space while local dividing is executed in the embodiment of this invention.
Figure 11:
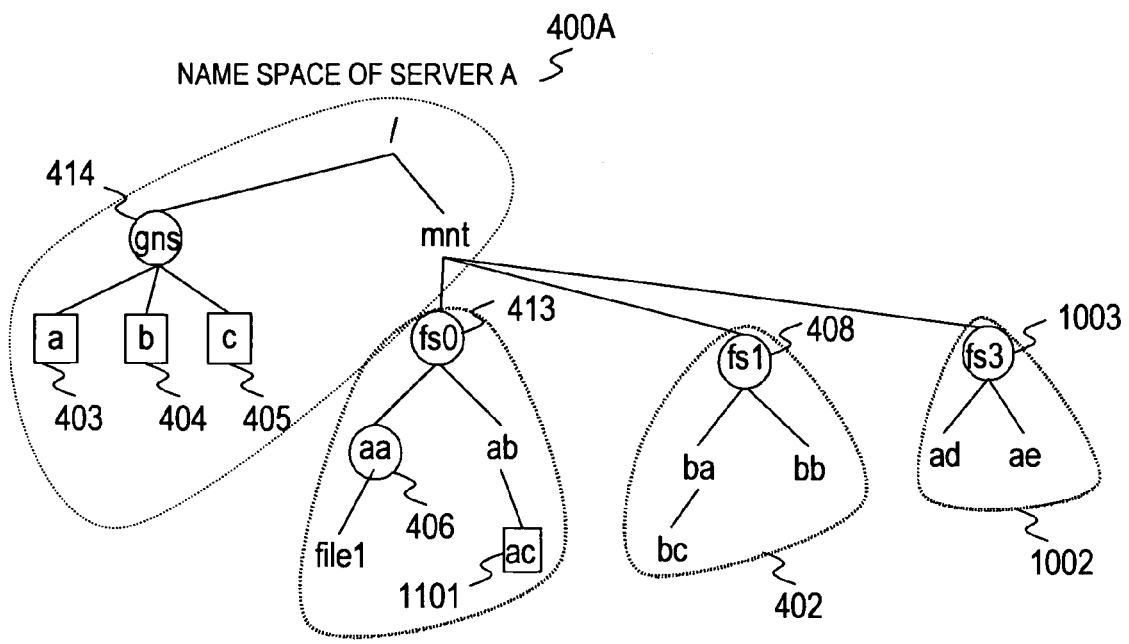
FIG. 11 is an explanatory diagram showing an example of a name space after local dividing is executed in the embodiment of this invention.

Described next with reference to FIGS. 10 to 12 is a specific example of processing of FIG. 9 when the new file system created in Step 901 is one that is managed by the own server.

To be specific, the description takes as an example a case in which a new file system managed by the server A is created by dividing a directory tree below a migration point "/mnt/fs0/ab/ac/" 407 of the server A.

FIG. 10 is an explanatory diagram showing an example of a name space while local dividing is executed in the embodiment of this invention.

Descriptions on portions of FIG. 10 that have been described with reference to FIG. 4 will be omitted here.

The file system dividing processing module 214 creates a new file system 1002 in the LDEV 124 that is not in use and available to the server A (901). The file system dividing processing module 214 locally mounts the newly created file system 1002 to the local path "/mnt/fs3/" of the server A.

The file system dividing processing module 214 next copies, to a directory tree below the file system 1002, files "ad" and "ae" belonging to a directory tree 1001 below the migration point 407 with their file IDs kept intact (902). The directory tree 1001 corresponds to a part of the file system 401.

Next, the file system dividing processing module 214 rewrites the migration point 601A of the migration point management table 600A from "/mnt/fs0/ab/ac" to "/mnt/fs3/" (903).

Next, the GNS management processing program 204 updates the GNS management table 500 (904). To be specific, the GNS management processing program 204 adds a new row 1201 to the GNS management table 500. The updated GNS management table, which is denoted by 1200, is as shown in FIG. 12. In the added row 1201, "server A" is registered as the server name 501, "/mnt/fs3/" is registered as the local path 502, and "/gns/a/ab/ac/" is registered as the connection point 503.

Next, the file system dividing processing module 214 connects a local path "/mnt/fs3/" 1003 of the server A to a connection point "/gns/a/ab/ac/" 1101 shown in FIG. 11 in accordance with the updated GNS management table 1200 (905).

This completes the local dividing of a file system.

FIG. 11 is an explanatory diagram showing an example of a name space after local dividing is executed in the embodiment of this invention.

FIG. 11 shows how a name space looks after the local dividing shown in FIG. 10 is finished. Descriptions on portions of FIG. 11 that have been described with reference to FIG. 10 will be omitted here.

In FIG. 11, the files "ad" and "ae" under the local path "/mnt/fs0/ab/ac/" of the server A have been deleted and "/gns/a/ab/ac/" 1101 is set as a new connection point.

FIG. 12 is an explanatory diagram showing an example of the GNS management table 1200 after local dividing is executed in the embodiment of this invention.

The GNS management table 1200 has the new row 1201 as has been described with reference to FIG. 10.

It is necessary to migrate the newly created file system to another server 110 after local dividing is finished. In the example of FIG. 11, the file system 1002 needs to migrate to, e.g., the server B. Migration is therefore executed in Step 804 of FIG. 8 after "yes" is given as the judgment in Step 803.

Figure 13:
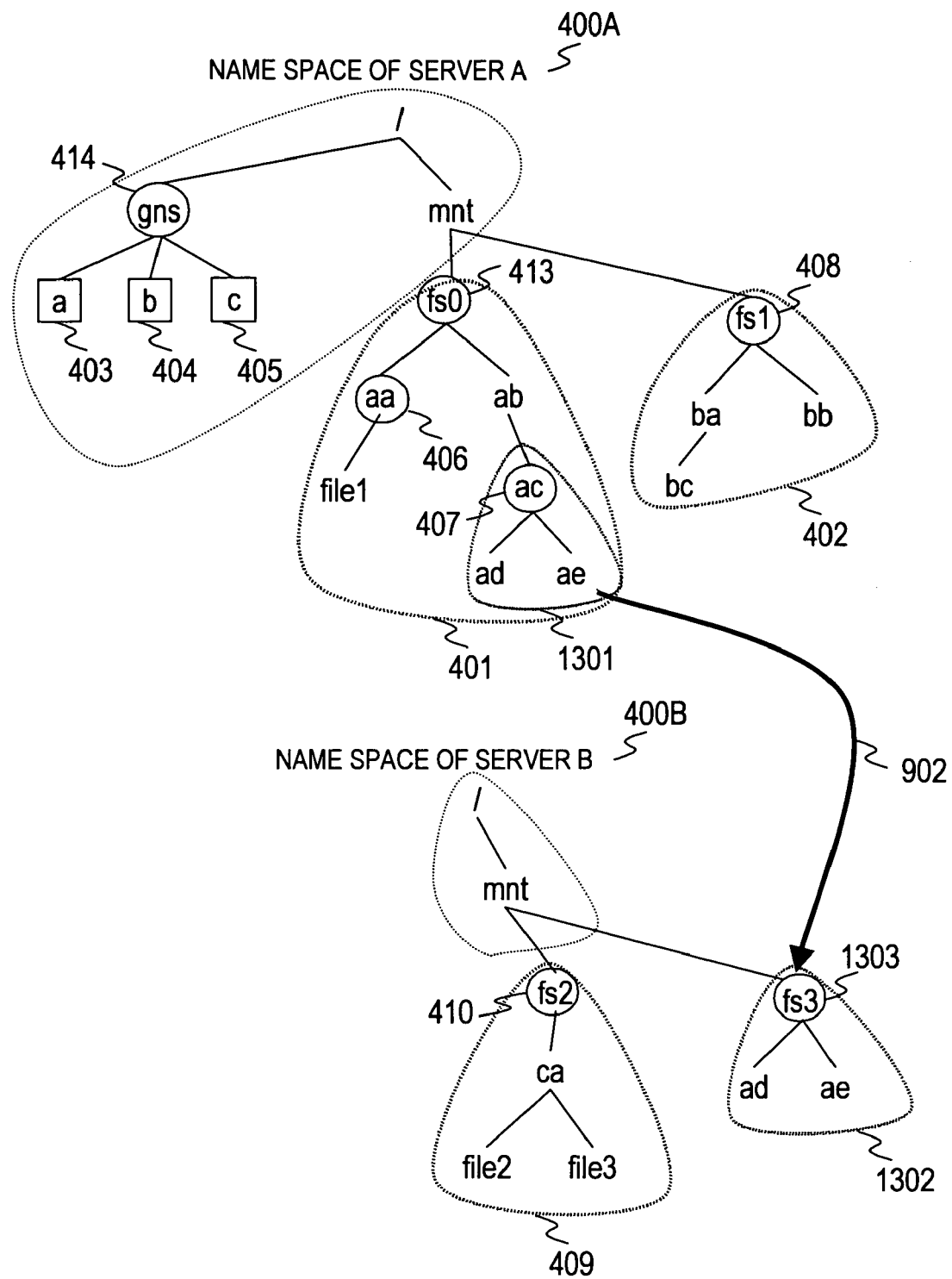
FIG. 13 is an explanatory diagram showing an example of name spaces while remote dividing is executed in the embodiment of this invention.

For instance, in the case where the file system 1002 migrates to the server B as shown in FIG. 13, which will be described later, the local name spaces of the server A and the server B after the migration is executed look as shown in FIG. 14, which will be described later. This moves a row of the migration point management table 600A for "/mnt/fs3/" to the migration point management table 600B. The GNS management table 500 after the migration is executed is as shown in FIG. 15, which will be described later.

Before the migration is executed, the value of the file system ID 602A is "3" in a row of the migration point management table 600A for "/mnt/fs3/". The value of the file system ID 602A, "3", is sent to the destination server B along with the path name "/mnt/fs3/" when the row of the migration point management table 600A for "/mnt/fs3/" is moved to the migration point management table 600B. The transmission may be executed over the LAN 160, the inter-server communication path 135, or other networks. The destination server B registers the path name "/mnt/fs3/" and the file system ID "3", which are received from the source server A, as the migration point 601B and the file system ID 602B, respectively. In this way, a migrated file is identified by the same file handle as before the migration is executed.

A supplementary explanation is given on the method of copying a file while keeping its file ID intact (Step 902 of FIG. 9). The file ID is an identifier assigned to each file uniquely throughout a file system. In order to copy a file without changing its file ID, it is necessary to make sure that the copy destination file system does not have a file that has the same file ID. However, the file system newly created in Step 901 is yet to have registered files, and it is therefore guaranteed that no file IDs overlap. A file can thus be copied without changing its file ID. In other words, after migration of one file, the migration destination server 110 identifies the migrated file by the same file ID that is used by the migration source server 110 to identify this file.

The client 150 accesses a file in the GNS by identifying the file uniquely throughout the storage system 100 with a file handle, which is a combination of a file system ID unique throughout the storage system 100 and a file ID unique throughout a file system. Upon reception of an access request with a file handle designated, the server 110 accesses a file that is identified by the designated file handle.

According to this invention, the file system ID and the file ID remain the same through the dividing of a file system. Also, the migration of a file system after dividing the file system changes neither the file system ID nor the file ID. This enables the client 150 to uniquely access a desired file after a file system is divided or migrated by using a file handle that is obtained before the file system is divided.

A new file system created by dividing a file system may be created in advance in the migration destination server 110. The division executed in this manner is remote dividing. To give an example, a description will be given with reference to FIGS. 13 to 15 on how the processing of FIG. 9 is executed when a new file system is created by dividing a directory tree below the migration point 407 of the original file system 401 and is used as a file system that is managed by the server B.

FIG. 13 is an explanatory diagram showing an example of name spaces while remote dividing is executed in the embodiment of this invention.

Descriptions on portions of FIG. 13 that have been described with reference to FIG. 4 or FIG. 10 will be omitted here.

The file system dividing processing module 214 creates a new file system 1302 in the LDEV 124 that is not in use and is available to the server B (901). The file system dividing processing module 214 locally mounts the newly created file system 1302 to the local path "/mnt/fs3/" of the server B.

The file system dividing processing module 214 next copies, to the file system 1302, files "ad" and "ae" under a directory tree 1301, which is below the migration point "/mnt/fs0/ab/ac/" 407, with their file IDs kept intact (902). The files may be copied over the LAN 160 or other networks.

Next, the file system dividing processing module 214 of the server A sends an instruction to the server B to add "/mnt/fs3/" as a migration point to the migration point management table 600B (903).

The instruction contains, as well as the migration point ID "/mnt/fs3/" to be newly added to the migration point management table 600B, the value "3" as the file system ID 602A that has been registered in the migration point management table 600A in association with the migration point ID "/mnt/fs3/". Accordingly, the row newly added to the migration point management table 600B has "/mnt/fs3/" and "3" as the migration point ID 601B and the file system ID 602B, respectively. A migrated file is thus identified by the same file handle as before the migration is executed.

Next, the file system dividing processing module 214 sends to the GNS management processing program 204 an instruction to update the GNS management table 500 (904). The GNS management processing program 204 adds a new row 1501 to the GNS management table 500. The updated GNS management table, which is denoted by 1500, is as shown in FIG. 15. In the added row 1501, "server B" is registered as the server name 501, "/mnt/fs3/" is registered as the local path 502, and "/gns/a/ab/ac/" is registered as the connection point 503.

Next, the file system dividing processing module 214 connects a local path "/mnt/fs3/" 1303 of the server B to a connection point "/gns/a/ab/ac/" 1401 shown in FIG. 14 in accordance with the updated GNS management table 1500 (905).

This completes the remote dividing of a file system.

FIG. 14 is an explanatory diagram showing an example of name spaces after remote dividing is executed in the embodiment of this invention.

FIG. 14 shows how name spaces look after the remote dividing shown in FIG. 13 is finished. Descriptions on portions of FIG. 14 that have been described with reference to FIG. 13 will be omitted here.

In FIG. 14, the files "ad" and "ae" under the local path "/mnt/fs0/ab/ac/" of the server A have been deleted and "/gns/a/ab/ac/" 1401 is set as a new connection point.

FIG. 15 is an explanatory diagram showing an example of the GNS management table 1500 after remote dividing is executed in the embodiment of this invention.

The GNS management table 1500 has the new row 1501 as has been described with reference to FIG. 13.

In the above remote dividing, migration of a file system to another server 110 is finished simultaneously with the completion of the dividing. The judgment made in Step 803 of FIG. 8 is therefore "no", and migration of Step 804 is not executed.

The creation of a file system in Step 901, the copying of files in Step 902, and the data double write and the communications with the GNS management processing program 204 may be executed either via the LAN 160 or the inter-server communication path 135.

As in the example of FIGS. 10 to 12, the method of executing migration after creating a new file in the server 110 that manages the original file system is called local dividing migration. As in the example of FIGS. 13 to 15, the method of creating a new file system in the migration destination server 110 in advance is called remote dividing migration.

Local dividing migration and remote dividing migration have conflicting advantages and disadvantages. The advantage of local dividing migration is that, in the case where a file system can be migrated merely by changing the settings of the switch 130 and thus switching paths between the server 110 and the disk controller 125, file copy between the servers 110 and other migration-related operations consume less network bandwidth. For instance, in the case where the server A and the server B share the same disk subsystem 120, migration from the server A to the server B can be achieved and the LDEV 124 that contains a file to be migrated can be moved from the server A to be placed under control of the server B by changing the settings of the switch 130.

The disadvantage of local dividing migration is that it is not executable when the migration source disk subsystem 120 is short of free capacity and when there are no LDEVs 124 left that are available to create a new file system.

The advantage of remote dividing migration is that the shortage of free capacity or the LDEVs 124 in the migration source disk subsystem 120 does not make remote dividing migration inexecutable as long as the migration destination disk subsystem 120 has free capacity or has enough LDEVs.

The disadvantage of remote dividing migration is that it consumes network bandwidth even in cases where completing migration only requires changing the settings of the switch 130 to switch paths between the server 110 and the disk controller 125.

This invention makes it possible to execute file system migration more efficiently by using the above described local dividing migration and remote dividing migration in combination.

Figure 16:
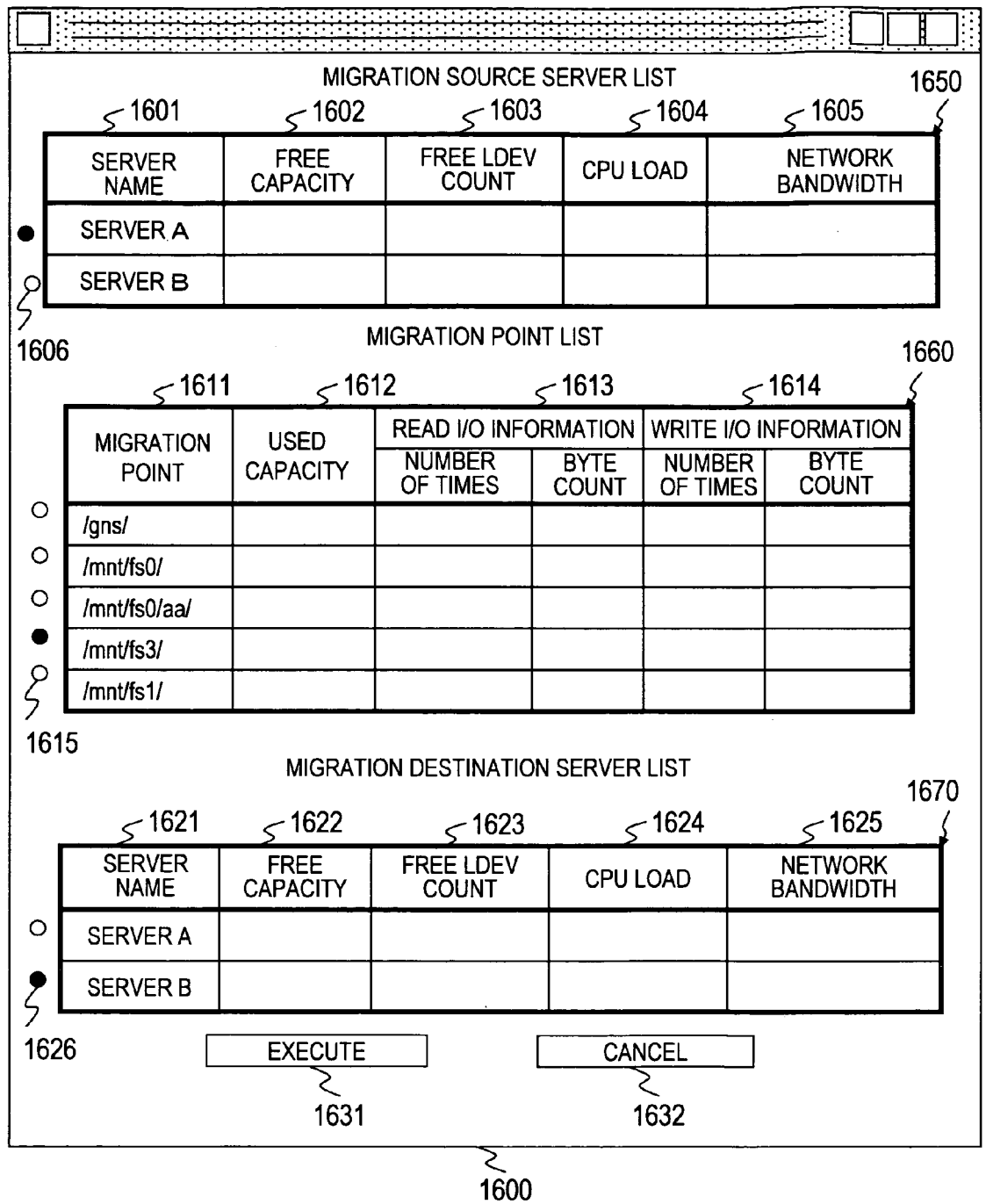
FIG. 16 is an explanatory diagram of a migration point selecting window, which is displayed on a management computer according to the embodiment of this invention.
Figure 17:
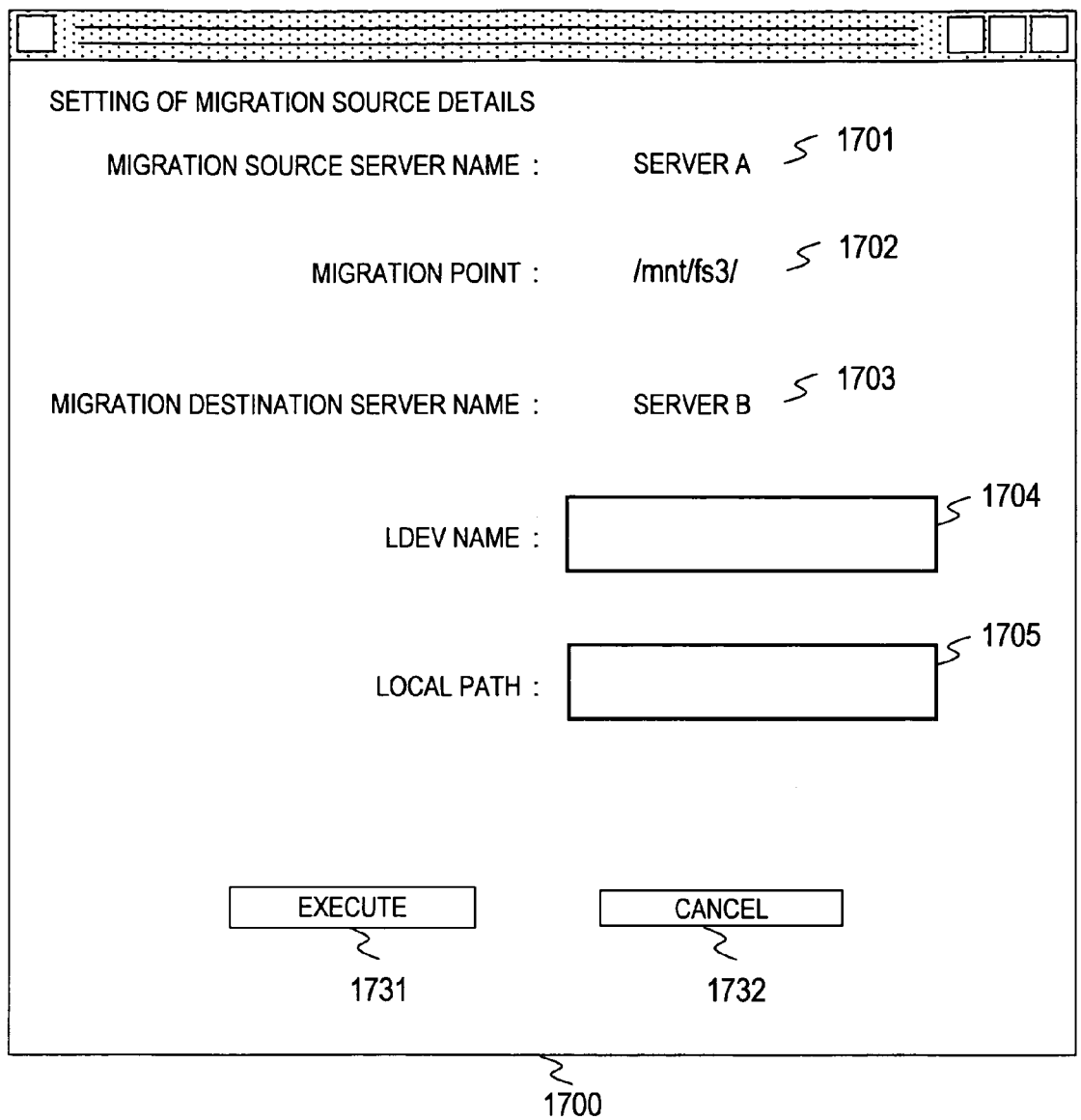
FIG. 17 is an explanatory diagram of a migration destination details setting window according to the embodiment of this invention.

As a specific example of how to prompt the execution of migration, FIGS. 16 and 17 shows a graphical user interface (GUI) that is used by an administrator to give an instruction to the server 110 through the management computer 140 to execute migration.

FIG. 16 is an explanatory diagram of a migration point selecting window, which is displayed on the management computer 140 according to the embodiment of this invention.

A migration point selecting window 1600 is displayed on the management screen 142 of the management computer 140. Displayed in the migration point selecting window 1600 are a migration source server list 1650, a migration point list 1660 and a migration destination server list 1670.

With the migration source server list 1650, the system administrator determines from which server 110 a directory tree is to be migrated. The migration source server list 1650 contains a server name 1601, a free capacity 1602, a free LDEV count 1603, a CPU load 1604 and a network bandwidth 1605.

The server name 1601 shows the server 110 that is a migration source candidate. The free capacity 1602 shows the free capacity of the disk subsystem 120 available to the server 110 that is indicated by the server name 1601. The free LDEV count 1603 shows the count of LDEVs set in the disk subsystem 120 available to the server 110 that is indicated by the server name 1601. The CPU load 1604 shows the value (e.g., in percentage) of the load currently applied to the CPU 112 by the server 110 that is indicated by the server name 1601. The network bandwidth 1605 shows how much (e.g., bytes per second) of network bandwidth is currently used by the server 110 that is indicated by the server name 1601. The system administrator operates entry selecting buttons 1606 to select one server name 1601. The server 110 indicated by the selected server name 1601 serves as the migration source server 110.

The system administrator operates the entry selecting buttons 1606 through the input device 141. When the input device 141 contains a mouse, for example, the system administrator may click on the mouse pointing one of the entry selecting buttons 1606. This applies also to an "execute" button 1631 and other buttons in the window.

The system administrator may choose, as a migration source, the server 110 whose free capacity 1602 is small, or the server 110 whose free LDEV count 1603 is small, or the server 110 whose CPU load 1604 is heavy, or the server 110 who consumes wide network bandwidth 1605. Alternatively, the migration source server 110 may be chosen by combining various types of information of from the columns 1602 to 1605.

The migration point list 1660 displays the migration point management table 600 of the server 110 that is selected with the selecting buttons 1606. As a migration point 1611, a used capacity 1612, read I/O information 1613 and write I/O information 1614 which are all contained in the migration point list 1660, values registered as the migration point 601, the used capacity 603, the read I/O information 604 and the write I/O information 605 in the migration point management table 600 are displayed.

The system administrator operates selecting buttons 1615 to select, out of migration points displayed in the migration point list, a directory tree to be migrated. To be specific, the system administrator selects a topmost directory of a directory tree to be migrated out of migration points registered as the migration point 1611.

The migration destination server list 1670 is made up of a server name 1621, a free capacity 1622, a free LDEV count 1623, a CPU load 1624 and a network bandwidth 1625. The system administrator selects which of the servers 110 listed in the migration destination server list 1670 is to serve as a migration destination for the directory tree below the migration point that is selected by operating the selecting buttons 1615. The system administrator makes the selection by operating selecting buttons 1626.

The server name 1621 shows the server 110 that is a migration destination candidate. The free capacity 1622 shows the free capacity of the disk subsystem 120 available to the server 110 that is indicated by the server name 1621. The free LDEV count 1623 shows the count of free LDEVs in the disk subsystem 120 available to the server 110 that is indicated by the server name 1621. The CPU load 1624 shows the value (e.g., in percentage) of the load currently applied to the CPU 112 by the server 110 that is indicated by the server name 1621. The network bandwidth 1625 shows how much (e.g., bytes per second) of network bandwidth is currently used by the server 110 that is indicated by the server name 1621.

The system administrator operates the "execute migration" button 1631, thereby causing the management screen 142 to display a migration destination details setting window 1700 shown in FIG. 17. A "cancel" button 1632 is used to close the migration point selecting window 1600 and cancel the migration processing.

FIG. 17 is an explanatory diagram of the migration destination details setting window 1700 according to the embodiment of this invention.

The migration destination details setting window 1700 contains a migration source server name displaying field 1701, a migration point displaying field 1702, a migration destination server name displaying field 1703, an LDEV name inputting field 1704, a local path inputting field 1705, an "execute" button 1731 and a cancel button 1732.

The migration source server name displaying field 1701 displays the server name 1601 of the server 110 that is selected as a migration source with the selecting buttons 1606 of FIG. 16. In the example of FIG. 17, "server A" is shown in the migration source server name displaying field 1701. The migration point displaying filed 1702 displays the migration point 1611 that is selected with the selecting buttons 1615. In the example of FIG. 17, "/mnt/fs3/" is shown in the migration point displaying field 1702. The migration destination server name displaying field 1703 displays the server name 1621 of the server 110 that is selected as a migration destination with the selecting buttons 1626. In the example of FIG. 17, "server B" is shown in the migration destination server name displaying field 1703.

The system administrator selects, as a migration destination, one of the LDEVs 124 available to the migration destination server 110, and enters the LDEV name of the selected LDEV 124 in the LDEV name inputting field 1704.

The system administrator then specifies to which local path of the migration destination server 110 a file system created in the migration destination LDEV 124 is to be locally mounted, and enters the local path in the local path inputting field 1705. As a result, a migration destination file system is created on the local path entered in the local path inputting field 1705 in the server 110 displayed in the migration destination server name displaying field 1703. A value entered in the local path inputting field 1705 corresponds to the local path 502 of the GNS management table 500.

As the system administrator operates the execute button 1731, the management computer 140 instructs the server software 200 to start migration. When the system administrator selects the cancel button 1732, the migration destination details setting window 1700 is closed.

When to employ local dividing migration instead of remote dividing migration and vice versa may be determined automatically. For instance, in the case where the server A and the server B share the same disk subsystem 120, migration from the server A to the LDEV 124 that is entered as an LDEV available to the server B in the LDEV name inputting field 1704 can be executed by merely switching paths. In this case, the management computer 140 may automatically create a directory for temporary local mounting of a file system in the LDEV 124 that is used for local dividing to the server A.

In the case where the server A and the server B do not share the same disk subsystem 120, switching paths is not enough to achieve migration. Therefore, remote dividing migration is automatically chosen and executed. Migration in this case is executed by creating the LDEV 124 that is entered in the LDEV name input field 1704 in the server B, creating a file system in the created LDEV 124, and copying files under a directory that is displayed in the migration point displaying field 1702 to the created file system with their file IDs kept intact.

FIGS. 16 and 17 illustrate a method in which a system administrator prompts the start of migration with the use of a GUI window. The GUI window is one of methods of prompting migration and other migration prompting methods may be employed instead: For example, a command line interface (CLI) may be used to prompt migration. Alternatively, which migration point is to be migrated between which servers 110 may be automatically determined based on statistical information of a migration source server, statistical information of a migration point management table, and statistical information of a migration destination server.

Figure 18:
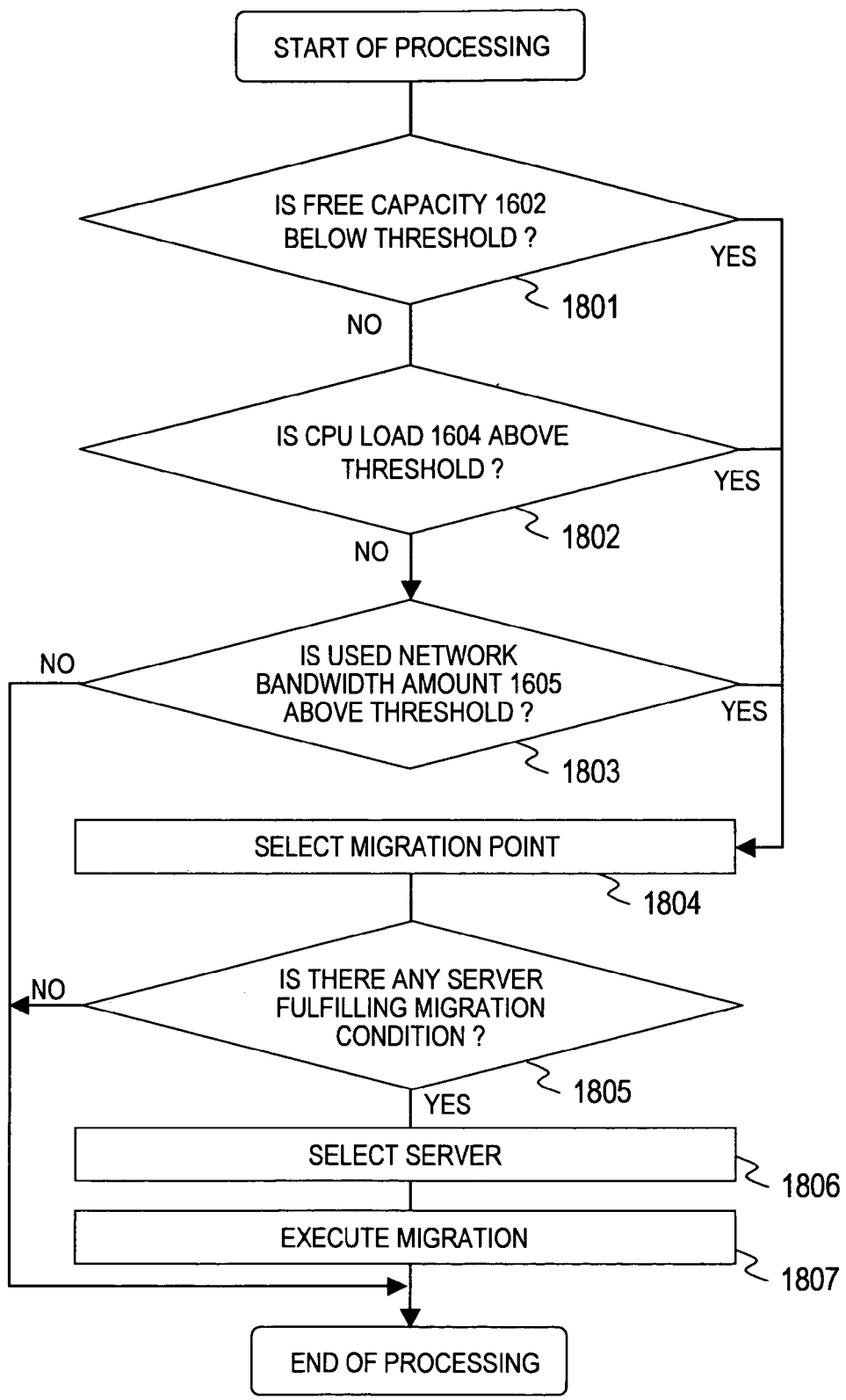
FIG. 18 is a flow chart illustrating processing that is executed by the management computer according to the embodiment of this invention to control the execution of migration based on statistical information.

FIG. 18 is a flow chart illustrating processing that is executed by the management computer 140 according to the embodiment of this invention to control the execution of migration based on statistical information.

FIG. 18 shows an example that employs, as the statistical information of each server, the free capacity 1602, the CPU load 1604 and the network bandwidth 1605. To be specific, these values are compared against threshold values set in advance, and the execution of migration is controlled based on the comparison results.

Processing of Steps 1801 to 1807 described below is performed on each server 110 that is displayed in the migration source server list 1650.

The CPU 144 of the management computer 140 first judges whether or not the value of the free capacity 1602 is below a predetermined threshold (1801).

When it is judged in Step 1801 that the free capacity 1602 is below the threshold (when the judgment is "yes"), it is considered that one specific LDEV 124 stores an unbalanced large amount of data. Then, it is desirable to disperse the amount of data stored in the LDEV 124 by executing migration. The processing in this case moves to Step 1804.

In this case, the CPU 144 selects, in Step 1804, one or more migration points whose used capacity 1612 is such that the free capacity 1602 exceeds the threshold.

When it is judged in Step 1801 that the free capacity 1602 is not below the threshold (when the judgment is "no"), the processing moves to Step 1802.

In Step 1802, the CPU 144 judges whether or not the value of the CPU load 1604 is above a given threshold.

When it is judged in Step 1802 that the CPU load 1604 is above the threshold (when the judgment is "yes"), it is considered that the processing load is concentrated on a specific server. Then, it is desirable to disperse the CPU load of the server 110 by executing migration. The processing in this case moves to Step 1804.

In this case, in Step 1804, the CPU 144 calculates, from the read I/O information 1613 and the write I/O information 1614, a CPU load applied as the clients 150 accesses each migration point. An approximate value may be calculated instead of an accurate CPU load. The CPU 144 selects one or more appropriate migration points such that the CPU load 1604 becomes smaller than the threshold through migration.

When it is judged in Step 1802 that the CPU load 1604 is not above the threshold (when the judgment is "no"), the processing moves to Step 1803.

In Step 1803, the CPU 144 judges whether or not the value of the network bandwidth 1605 (i.e., the used amount of network bandwidth) is above a given threshold.

When it is judged in Step 1803 that the network bandwidth 1605 is above the threshold (when the judgment is "yes"), it is considered that the communication load is concentrated on a specific server. Then, it is desirable to disperse the communication load by executing migration. The processing in this case moves to Step 1804.

In this case, in Step 1804, the CPU 144 calculates how much of the network bandwidth is used per unit time based on the read byte count 1613 and the write byte count 1614. Based on the calculation results, the CPU 144 selects one or more appropriate migration points such that the network bandwidth 1605 becomes smaller than the threshold.

When it is judged in Step 1803 that the network bandwidth 1605 is not above the threshold (when the judgment is "no"), it means that neither the data amount nor the load is concentrated on a specific server. In this case, there is no need to execute migration and the processing is ended.

After executing Step 1804, the CPU 144 judges whether or not there is the server 110 that meets migration conditions (1805).

To be specific, the CPU 144 selects, out of the servers 110 whose free LDEV count 1623 is equal to or larger than the count of migration points selected in Step 1804, the server 110 that is predicted to still fulfill the following three conditions after the migration points selected in Step 1804 are migrated:

(1) The free capacity 1602 is not below a given threshold.
(2) The CPU load 1604 does not exceed a given threshold.
(3) The network bandwidth 1605 does not exceed a given threshold.

When it is judged in Step 1805 that there is the server 110 that meets the migration conditions, the concentration of, for example, the load on a specific server 110 is dispersed by executing migration to the server 110 that meets the migration conditions. The CPU 144 therefore selects as a migration destination the server 110 that meets the conditions (1806). In the case where a plurality of servers 110 meet the conditions, as many of these servers 110 as desired may be selected as migration destinations.

The CPU 144 next sends to the server 110 an instruction to migrate a migration point selected in Step 1804 to the server 110 selected in Step 1806 (1807). In the case of migrating a plurality of migration points, the migration points may all be migrated to one server 110, or may be dispersed among a plurality of migration destination servers 110. In the latter case, however, the plurality of servers 110 have to be capable of providing as the free LDEV count 1623 a total count equal to the count of the selected migration points and all of the plurality of servers 110 have to fulfill the above conditions (1) to (3).

When it is judged in Step 1805 that no server 110 meets the migration conditions, it means that executing migration does not even out the concentrated load on a specific server 110 and other imbalances. Then, the CPU 144 ends the processing.

Executing the above processing keeps the free capacity 1602, the CPU load 1604 and the network bandwidth 1605 within their proper ranges for every server 110.

The following processing is made possible by archiving each type of statistical information employed.

For instance, a reference to the histories of the used capacity 1612, the read I/O information 1613 and the write I/O information 1614 about one migration point reveals that whether or not this migration point is used mostly for reading. A migration point that is used mostly for reading may be migrated in advance to the server 110 having the LDEV 124 that is suitable for archiving.

Also, a migration point of which the used capacity shows a significant increase can be found by referring to the histories of the used capacity 1612 and the write I/O information 1614. This migration point may be migrated in advance to the server 110 that has an LDEV 124 with an especially large value as the free capacity 1602 and excellent write performance.

A reference to the histories of the read I/O byte count 1613 and the write I/O byte count 1614 reveals whether or not a migration point exhibits an increase in network bandwidth consumption. A migration point whose network bandwidth consumption is increasing may be migrated in advance to the server 110 that has an especially wide network bandwidth.

Archiving statistical information also makes it possible to prohibit a migration point that has been migrated once from being migrated again for a while in order to avoid lowering the overall performance of the entire storage system due to repeating migration in a short period of time.

Statistical information of the servers 110 (i.e., information displayed in the migration source server list 1650 and the migration destination server list 1670) may be obtained when the management computer 140 displays the window for migration, or may be obtained periodically. The servers 110 may use the LAN 160 or the inter-server communication path 135 to communicate with one another.

Described next are effects of the embodiment of this invention.

One of conventional methods of executing fine-grained migration in a manner that is transparent to clients is to prepare in the storage system 100 many file systems each of which has small capacity. The conventional method and the embodiment of this invention will be compared below with reference to FIG. 19.

Figure 19:
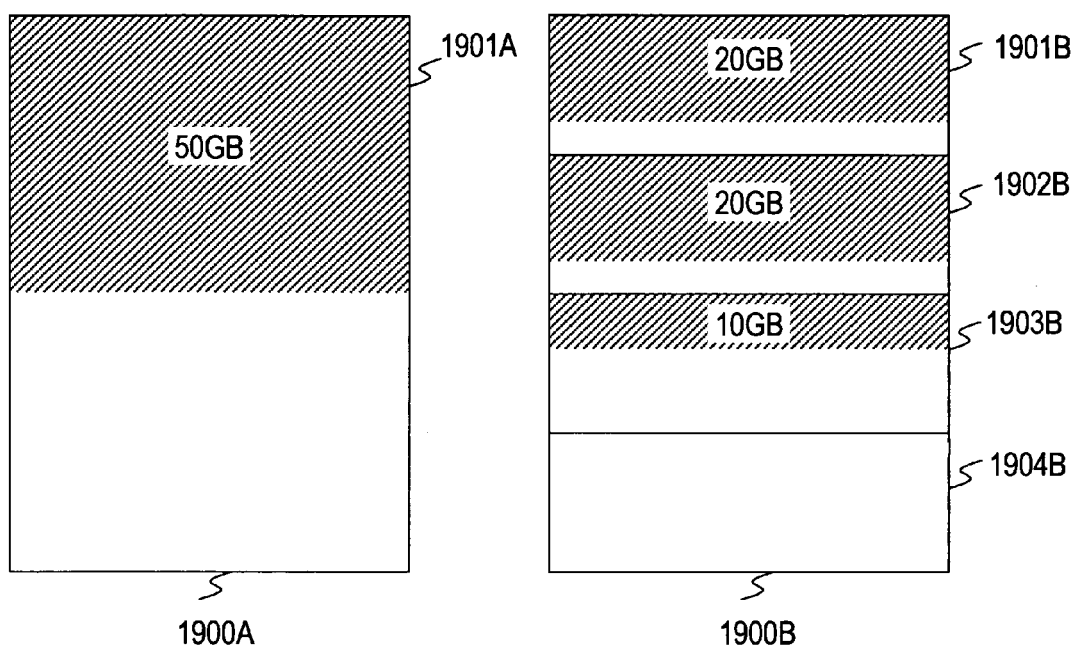
FIG. 19 is an explanatory diagram comparing the embodiment of this invention to a method of prior art.

FIG. 19 is an explanatory diagram comparing the embodiment of this invention against the prior art.

For conveniences of explanation, a storage system 1900A and a storage system 1900B each have a 100-GB storage capacity. The embodiment of this invention is applied to the storage system 1900A whereas the conventional method is applied to the storage system 1900B. The storage system 1900A contains only one file system, which is denoted by 1901A and has a storage capacity of 100 GB. The storage system 1900B has small-capacity file systems prepared in advance. To be specific, the storage system 1900B contains four file systems, 1901B, 1902B, 1903B and 1904B, each having a storage capacity of 25 GB.

The data amount of files stored in the storage systems 1900A and 1900B is 50 GB each. Hatched areas in FIG. 19 represent used areas (i.e., areas where files are stored) of the storage systems 1900A and 1900B. In the storage system 1900B, the file systems 1901B and 1902B each store 20 GB of data, the file system 1903B stores 10 GB of data, and the file system 1904B does not store data.

FIG. 19 shows an example in which migration is executed when the utilization ratio of each file system reaches 80%. The file system utilization ratio is the ratio (%) of a capacity that is actually in use to the full storage capacity set to each file system.

Under this condition, the storage system 1900A, where the utilization ratio of the file system 1901A is 50%, does not need to execute migration. The storage system 1900B, on the other hand, has to execute migration for the file systems 1901B and 1902B whose utilization ratio is 80%, which is the migration threshold. While files congregate in the file systems 1901B and 1902B, the file systems 1903B and 1904B have a plenty of free capacity. In addition to needing to execute migration more frequently than the storage system 1900A does, the storage system 1900B has a possibility that the initially allocated file system 1904B is wasted. The storage system 1900B is therefore wasteful in terms of both performance and utilization efficiency of the storage system 100.

In order to efficiently use the storage system 100 with the conventional method of achieving fine-grained migration by creating small-capacity file systems in advance while avoiding the situation as the one shown in the example of FIG. 19, a detailed operation schedule has to be planned for each file system. However, it is difficult in practice to make a detailed operation plan for the storage system 100 beforehand.

In contrast, the embodiment of this invention is capable of limiting the count of file systems to a minimum number necessary by dividing a file system as necessary and executing migration for sections of the file system separately. This embodiment therefore has effects of preventing performance degradation due to frequent migration processing and avoiding the inefficient use of capacity compared to the method applied to the storage system 1900B of FIG. 19.

As has been described, according to the embodiment of this invention, fine-grained migration can be executed in a manner that is transparent to clients by dividing a file system in the storage system 100 which has a plurality of servers 110. This makes it possible to better balance the load among the plurality of servers 110, and contributes to the improvement of the overall performance of the storage system 100.

What is claimed is:

1. A storage system, comprising:
a plurality of servers being coupled to a client computer, integrating a plurality of file systems which are managed by each of the plurality of servers, and providing a global name space (GNS) for the client computer to access any one of a plurality of files by sending an access request to any of the plurality of servers; and
a disk subsystem being coupled to the plurality of servers and storing the plurality of files,
wherein each of the plurality of servers is configured to comprise GNS management information including a plurality of relationships each relating a local path, to which a file system of the plurality of file systems is locally mounted in a local name space managed by a respective one of the plurality of servers, to a connecting point on the GNS,
wherein each of the plurality of servers is configured to comprise migration point management information including a plurality of relationships each relating a migration point, which is a local path of a directory below a root directory managed by one of the plurality of servers and is served as a base point of dividing a portion from a file system of the plurality of file systems, to a file system identifier (ID) uniquely identified throughout the storage system,
wherein, when the client computer sends a name resolve request of a first file identified by a first path of the GNS to first one of the plurality of servers, the first one of the plurality of servers is configured to acquire a first local path corresponding to the first path of the GNS based on the GNS management information, if the first local path is managed by the first one of the plurality of servers, and is further configured to transfer the name resolve request to a second one of the plurality of servers based on the GNS management information, if the first local path is managed by the second one of the plurality of servers,
wherein, if the first one of the plurality of servers acquires the first local path, the first one of the plurality of servers is configured to acquire a first migration point that is above and closest to the first local path, is further configured to acquire a first file system ID of the first migration point based on the migration point management information, and is further configured to send to the client computer a file handle including the first file system ID and a first file identifier (ID) associated with the first file,
wherein, if the second one of the plurality of servers acquires the first local path after receiving the name resolve request transferred from the first one of the plurality of servers, the second one of the plurality of servers is configured to acquire the first migration point, is further configured to acquire the first file system ID of the first migration point based on the migration point management information, and is further configured to send to the client computer the file handle including the first file system ID and the first file ID associated with the first file, and
wherein, when the first one of the plurality of servers receives a migration request designating the first migration point to be migrated, the first one of the plurality of servers is configured to divide a portion from a first file system of the plurality of file systems, if the first one of the plurality of servers acquires the first local path and the first migration point is not a topmost directory of the first file system of the plurality of file systems, and is further configured to migrate the portion of the first file system to the second one of the plurality of servers after dividing the portion from the first file system.

2. The storage system according to claim 1, further comprising:
a management computer being coupled to each of the plurality of servers and comprising a file system ID management information managing whether or not each of a plurality of the file system ID is assigned, so that a common file system ID is not used for two or more migration points.

3. The storage system according to claim 1, wherein the name resolve request of the first file identified by the first path of the GNS is sent from the client computer to the first one of the plurality of servers before the migration of the portion of the first file system, and the client computer can continue to use the file handle after the migration of the portion of the first file system.

4. The storage system according to claim 1, wherein the migration point management information is stored in a memory of each of the plurality of servers.

5. The storage system according to claim 1,
wherein, if the first one of the plurality of servers migrates the portion of the first file system to the second one of the plurality of servers, the first one of the plurality of servers is configured to update the first migration point in one of the plurality of relationships in the migration point management information of the first one of the plurality of servers based on the migration of the portion of the first file system.

6. The storage system according to claim 1,
wherein, if the first one of the plurality of servers migrates the portion of the first file system to the second one of the plurality of servers, the first one of the plurality of servers is configured to add a new relationship in the GNS management information of each of the plurality of servers based on the migration of the portion of the first file system.

7. A computer program stored in a computer readable storage medium and executable by a storage system, the storage system comprising a plurality of servers and a disk subsystem, the plurality of servers being coupled to a client computer, integrating a plurality of file systems which are managed by each of the plurality of servers, and providing a global name space (GNS) for the client computer to access any one of a plurality of files by sending an access request to any of the plurality of servers, the disk subsystem being coupled to the plurality of servers and storing the plurality of files, the computer program comprising;
a module for storing in each of the plurality of servers GNS management information including a plurality of relationships each relating a local path, to which a file system of the plurality of file systems is locally mounted in a local name space managed by a respective one of the plurality of servers, to a connecting point on the GNS;
a module for storing in each of the plurality of servers migration point management information including a plurality of relationships each relating a migration point, which is a local path of a directory below a root directory managed by one of the plurality of servers and is served as a base point of dividing a portion from a file system of the plurality of file systems, to a file system identifier (ID) uniquely identified throughout the storage system;
a module of the first one of the plurality of servers for acquiring, when the client computer sends a name resolve request of a first file identified by a first path of the GNS to first one of the plurality of servers, a first local path corresponding to the first path of the GNS based on the GNS management information, if the first local path is managed by the first one of the plurality of servers, and for transferring the name resolve request to a second one of the plurality of servers based on the GNS management information, if the first local path is managed by the second one of the plurality of servers;

a module of the first one of the plurality of servers for acquiring, if the first one of the plurality of servers acquires the first local path, a first migration point that is above and closest to the first local path, and for acquiring a first file system ID of the first migration point based on the migration point management information, and for sending to the client computer a file handle including the first file system ID and a first file identifier (ID) associated with the first file;

a module of the second one of the plurality of servers for acquiring, if the second one of the plurality of servers acquires the first local path after receiving the name resolve request transferred from the first one of the plurality of servers, the first migration point, and for acquiring the first file system ID of the first migration point based on the migration point management information, and for sending to the client computer the file handle including the first file system ID and the first file ID associated with the first file; and a module of the first one of the plurality of servers for dividing, when the first one of the plurality of servers receives a migration request designating the first migration point to be migrated, a portion from a first file system of the plurality of file systems, if the first one of the plurality of servers acquires the first local path and the first migration point is not a topmost directory of the first file system of the plurality of file systems, and for migrating a portion of the first file system to the second one of the plurality of servers after dividing the portion from the first file system.

8. The computer program according to claim 7, wherein the storage system comprising a management computer being coupled to each of the plurality of servers, and the computer program further comprising:

a module of the management computer for comprising a file system ID management information managing whether or not each of a plurality of the file system ID is assigned, so that a common file system ID is not used for two or more migration points.

9. The computer program according to claim 7, wherein the name resolve request of the first file identified by the first path of the GNS is sent from the client computer to the first one of the plurality of servers before the migration of the portion of the first file system, and the client computer can continue to use the file handle after the migration of the portion of the first file system.

10. The computer program according to claim 7, further comprising:

a module for storing the migration point management information in a memory of each of the plurality of servers.

11. The computer program according to claim 7, further comprising:

a module of the first one of the plurality of servers for updating, if the first one of the plurality of servers migrates the portion of the first file system to the second one of the plurality of servers, the first migration point in one of the plurality of relationships in the migration point management information of the first one of the plurality of servers based on the migration of the portion of the first file system.

12. The computer program according to claim 7, further comprising:

a module of the first one of the plurality of servers for adding, if the first one of the plurality of servers migrates the portion of the first file system to the second one of the plurality of servers, new relationship in the GNS management information of each of the plurality of servers based on the migration of the portion of the first file system.

13. A method of controlling a storage system, the storage system comprising a plurality of servers and a disk subsystem, the plurality of servers being coupled to a client computer, integrating a plurality of file systems which are managed by each of the plurality of servers, and providing a global name space (GNS) for the client computer to access any one of a plurality of files by sending an access request to any of the plurality of servers, the disk subsystem being coupled to the plurality of servers and storing the plurality of files, the method comprising:

storing in each of the plurality of servers, GNS management information including a plurality of relationships each relating a local path, to which a file system of the plurality of file systems is locally mounted in a local name space managed by a respective one of the plurality of servers, to a connecting point on the GNS;

storing in each of the plurality of servers, migration point management information including a plurality of relationships each relating a migration point, which is a local path of a directory below a root directory managed by one of the plurality of servers and is served as a base point of dividing a portion from a file system of the plurality of file systems, to a file system identifier (ID) uniquely identified throughout the storage system;

when the client computer sends a name resolve request of a first file identified by a first path of the GNS to a first one of the plurality of servers, by first one of the plurality of servers, acquiring a first local path corresponding to the first path of the GNS by the first one of the plurality of servers based on the GNS management information, if the first local path is managed by the first one of the plurality of servers, and transferring the name resolve request to a second one of the plurality of servers based on the GNS management information, if the first local path is managed by the second one of the plurality of servers;

if the first one of the plurality of servers acquires the first local path, by first one of the plurality of servers, acquiring a first migration point that is above and closest to the first local path by the first one of the plurality of servers, and acquiring a first file system ID of the first migration point based on the migration point management information, and sending to the client computer a file handle including the first file system ID and a first file identifier (ID) associated with the first file;

by the second one of the plurality of servers, acquiring the first migration point, if the second one of the plurality of servers acquires the first local path after receiving the name resolve request transferred from the first one of the plurality of servers, acquiring the first file system ID of the first migration point based on the migration point management information, and sending to the client computer the file handle including the first file system ID and the first file ID associated with the first file; and when the first one of the plurality of servers receives a migration request designating the first migration point to be migrated, by first one of the plurality of servers, dividing a portion from a first file system of the plurality of file systems, if the first one of the plurality of servers acquires the first local path and the first migration point is not a topmost directory of the first file system of the plurality of file systems, and migrating a portion of the first file system to the second one of the plurality of servers after dividing the portion from the first file system.

14. The method according to claim 13, wherein the storage system comprising a management computer being coupled to each of the plurality of servers, and the method further comprising:

comprising, by the management computer, a file system ID management information managing whether or not each of a plurality of the file system ID is assigned, so that a common file system ID is not used for two or more migration points.

15. The method according to claim 13, wherein the name resolve request of the first file identified by the first path of the GNS is sent from the client computer to the first one of the plurality of servers before the migration of the portion of the first file system, and the client computer can continue to use the file handle after the migration of the portion of the first file system.

16. The method according to claim 13, further comprising:

storing the migration point management information in a memory of each of the plurality of servers.

17. The method according to claim 13, further comprising:

if the first one of the plurality of servers migrates the portion of the first file system to the second one of the plurality of servers, updating, by the first one of the plurality of servers, the first migration point in one of the plurality of relationships in the migration point management information of the first one of the plurality of servers based on the migration of the portion of the first file system.

18. The method according to claim 13, further comprising:

if the first one of the plurality of servers migrates the portion of the first file system to the second one of the plurality of servers, adding, the first one of the plurality of servers, new relationship in the GNS management information of each of the plurality of servers based on the migration of the portion of the first file system.

* * * * *